(12) United States Patent
Yu et al.

(10) Patent No.: US 10,721,344 B2
(45) Date of Patent: Jul. 21, 2020

(54) METHOD FOR ADDING CONTACT INFORMATION FROM INSTANT MESSAGING WITH CIRCLE GESTURES AND USER EQUIPMENT

(71) Applicant: Huawei Technologies Co., Ltd., Shenzhen (CN)

(72) Inventors: Xiaobo Yu, Beijing (CN); Shuiping Long, Beijing (CN); Wenmei Gao, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 110 days.

(21) Appl. No.: 15/784,955

(22) Filed: Oct. 16, 2017

(65) Prior Publication Data

US 2018/0041620 A1 Feb. 8, 2018

Related U.S. Application Data

(63) Continuation of application No. PCT/CN2015/076894, filed on Apr. 17, 2015.

(51) Int. Cl.
| | |
|---|---|
| *G06F 9/48* | (2006.01) |
| *H04M 1/27457* | (2020.01) |
| *H04M 1/725* | (2006.01) |
| *G06F 3/0486* | (2013.01) |
| *G06F 3/0488* | (2013.01) |
| *G10L 15/26* | (2006.01) |

(52) U.S. Cl.
CPC ...... *H04M 1/27457* (2020.01); *G06F 3/0486* (2013.01); *G06F 3/04883* (2013.01); *G10L 15/265* (2013.01); *H04M 1/725* (2013.01); *H04M 1/72552* (2013.01)

(58) Field of Classification Search
CPC ........... H04M 1/274533; H04M 1/725; H04M 1/72552; G06F 3/0486; G06F 3/04883; G10L 15/265
See application file for complete search history.

(56) References Cited

U.S. PATENT DOCUMENTS

| | | | |
|---|---|---|---|
| 6,775,651 B1 * | 8/2004 | Lewis ................. | H04M 3/5307 379/88.01 |
| 8,374,319 B1 * | 2/2013 | Bridges ................. | H04M 3/436 379/88.22 |
| 9,996,544 B2 * | 6/2018 | Lei ................. | H04M 1/274533 |
| 2005/0044152 A1 | 2/2005 | Hardy et al. | |

(Continued)

FOREIGN PATENT DOCUMENTS

| | | |
|---|---|---|
| CN | 101867776 A | 10/2010 |
| CN | 101951425 A | 1/2011 |

(Continued)

*Primary Examiner* — Jennifer N To
*Assistant Examiner* — Kuang F Chen
(74) *Attorney, Agent, or Firm* — Slater Matsil, LLP

(57) ABSTRACT

The present disclosure provides a method for adding contact information, and user equipment. The method includes: receiving gesture information input by a user on a communication interface of an instant messaging application, recognizing contact information in communication information according to the gesture information, and adding the contact information to an address book of user equipment.

19 Claims, 11 Drawing Sheets

(56) References Cited

U.S. PATENT DOCUMENTS

| | | | |
|---|---|---|---|
| 2012/0044179 A1* | 2/2012 | Hudson | G06F 3/04883 345/173 |
| 2013/0203468 A1 | 8/2013 | Weng | |
| 2014/0285452 A1* | 9/2014 | Park | G06F 3/041 345/173 |
| 2014/0349690 A1* | 11/2014 | Yang | H04W 4/14 455/466 |
| 2014/0372939 A1* | 12/2014 | Parker | G06F 3/0481 715/799 |
| 2015/0169213 A1* | 6/2015 | Choi | G06F 3/167 715/728 |
| 2015/0189484 A1 | 7/2015 | Long | |
| 2016/0217114 A1 | 7/2016 | Fan et al. | |
| 2017/0153795 A1* | 6/2017 | Yang | G06F 3/0481 |

FOREIGN PATENT DOCUMENTS

| | | |
|---|---|---|
| CN | 102917131 A | 2/2013 |
| CN | 103064620 A | 4/2013 |
| CN | 103200293 A | 7/2013 |
| CN | 103294385 A | 9/2013 |
| CN | 104079696 A | 10/2014 |
| CN | 104125321 A | 10/2014 |
| CN | 104270498 A | 1/2015 |
| CN | 104461474 A | 3/2015 |
| CN | 104486749 A | 4/2015 |
| JP | 2004040339 A | 2/2004 |
| WO | 2014173242 A1 | 10/2014 |

\* cited by examiner

METHOD FOR ADDING CONTACT INFORMATION FROM INSTANT MESSAGING WITH CIRCLE GESTURES AND USER EQUIPMENT

CROSS-REFERENCE TO RELATED APPLICATIONS

This application is a continuation of International Application No. PCT/CN2015/076894, filed on Apr. 17, 2015, the disclosure of which is hereby incorporated by reference in its entirety.

TECHNICAL FIELD

The present disclosure relates to communications technologies, and in particular, to a method for adding contact information, and user equipment.

BACKGROUND

With development of the Internet and smart terminals, more users use various types of social software or clients to perform social activities, and with enlargement of a network friend circle, new friends may be made by using various approaches. When contact information of a new friend is obtained or contact information of an old friend is replaced, the contact information may be sent by using a short message service message or a social client, and a user who receives the contact information adds or updates the contact information.

In the prior art, if a user intends to add, to an address book of User Equipment (UE), contact information sent by a friend, the user needs to first select a number, and then add the number step by step according to a prompt of the UE. For example, a window pops up first to prompt whether to add the number, and then prompt whether to create a new contact or to add the number to an existing contact, and then the user completes adding after entering a phonebook setting interface to set other information. Each step in the foregoing entire procedure for adding contact information requires a user to perform a selection. Therefore, efficiency of adding contact information by using the prior art is low.

SUMMARY

Embodiments of the present disclosure provide a method for adding contact information, and user equipment, so as to resolve a prior-art problem that efficiency of adding contact information is low.

A first aspect of the embodiments of the present disclosure provides a method for adding contact information. The method includes receiving, by user equipment, gesture information input by a user on a communication interface of an instant messaging application. The method also includes recognizing, by the user equipment, according to the gesture information, contact information in communication information corresponding to the communication interface. The method also includes adding, by the user equipment, the contact information to an address book of the user equipment.

With reference to the first aspect, in a first possible implementation manner of the first aspect, before the recognizing, by the user equipment, according to the gesture information, contact information in communication information corresponding to the communication interface, the method includes: matching, by the user equipment, the gesture information with preset gesture recognition information; and determining, by the user equipment, that the gesture information is the same as the preset gesture recognition information.

With reference to the first aspect or the first possible implementation manner of the first aspect, in a second possible implementation manner of the first aspect, the contact information includes at least a first information element and a second information element.

With reference to any one of the first aspect to the second possible implementation manner of the first aspect, in a third possible implementation manner of the first aspect, if the communication information corresponding to the communication interface includes voice information, before the recognizing, by the user equipment, according to the gesture information, contact information in communication information corresponding to the communication interface, the method includes: converting, by the user equipment, the voice information to text information.

With reference to the second possible implementation manner of the first aspect, in a fourth possible implementation manner of the first aspect, the recognizing, by the user equipment, according to the gesture information, contact information in communication information corresponding to the communication interface includes: recognizing, by the user equipment, the first information element in a range circled by or information tapped by the gesture information on the communication interface of the instant messaging application; recognizing, by the user equipment, the second information element according to directions of a start position and a stop position of the gesture information on the communication interface of the instant messaging application relative to a position of the first information element; and using, by the user equipment, a combination of the first information element and the second information element as the contact information.

With reference to the second possible implementation manner of the first aspect, in a fifth possible implementation manner of the first aspect, the receiving, by user equipment, gesture information input by a user on a communication interface of an instant messaging application includes: receiving, by the user equipment, first gesture information and second gesture information that are consecutively input by the user on the communication interface of the instant messaging application, where the first gesture information and the second gesture information are at an interval of a first preset time period.

With reference to the fifth possible implementation manner of the first aspect, in a sixth possible implementation manner of the first aspect, the recognizing, by the user equipment, according to the gesture information, contact information in communication information corresponding to the communication interface includes: recognizing, by the user equipment, the first information element in a range circled by or information tapped by the first gesture information; recognizing, by the user equipment, the second information element in a range circled by or information tapped by the second gesture information; and using, by the user equipment, a combination of the first information element and the second information element as the contact information.

With reference to the fifth possible implementation manner of the first aspect, in a seventh possible implementation manner of the first aspect, the recognizing, by the user equipment, according to the gesture information, contact information in communication information corresponding to the communication interface includes: recognizing, by the user equipment, the first information element in a range circled by or information tapped by the first gesture information; recognizing, by the user equipment, the second information element in a stop position of the second gesture information, where the second gesture information is to drag the first information element to a position of the second information element; and using, by the user equipment, a combination of the first information element and the second information element as the contact information.

With reference to the second possible implementation manner of the first aspect, in an eighth possible implementation manner of the first aspect, the receiving, by user equipment, gesture information input by a user on a communication interface of an instant messaging application includes: receiving, by the user equipment, first gesture information, second gesture information, and third gesture information that are consecutively input by the user on the communication interface of the instant messaging application, where the second gesture information is used to associate the first gesture information and the third gesture information; and the recognizing, by the user equipment, according to the gesture information, contact information in communication information corresponding to the communication interface includes: recognizing, by the user equipment, the first information element in a range circled by or information tapped by the first gesture information; recognizing, by the user equipment, the second information element in a range circled by or information tapped by the third gesture information; and combining, by the user equipment, the first information element and the second information element as the contact information according to the second gesture information.

With reference to any one of the second to the eighth possible implementation manners of the first aspect, in a ninth possible implementation manner of the first aspect, after the recognizing, by the user equipment, according to the gesture information, contact information in communication information corresponding to the communication interface, the method further includes: receiving, by the user equipment, information about a tap by the user on the communication interface on any information element in the contact information within a second preset time period, where the information about the tap is used to trigger the user equipment to add the contact information to the address book of the user equipment.

With reference to any one of the second to the ninth possible implementation manners of the first aspect, in a tenth possible implementation manner of the first aspect, the first information element is contact communication information, and the second information element is a contact name, where the contact communication information includes at least one of the following: a contact instant messaging account, a contact phone number, or a contact email.

With reference to the tenth possible implementation manner of the first aspect, in an eleventh possible implementation manner of the first aspect, the adding, by the user equipment, the contact information to an address book of the user equipment includes: determining, by the user equipment, whether the current address book includes the contact communication information, and if not, adding the contact information to the address book of the user equipment.

With reference to the tenth possible implementation manner of the first aspect, in a twelfth possible implementation manner of the first aspect, the adding, by the user equipment, the contact information to an address book of the user equipment includes: determining, by the user equipment, whether the current address book includes the contact communication information; and if the current address book does not include the contact communication information, determining whether the current address book includes the contact name; and if not, adding the contact information to the address book of the user equipment, or if yes, displaying to the user whether to add the contact information to an existing contact notification, and adding the contact information to the address book of the user equipment according to an instruction of the user.

With reference to the twelfth possible implementation manner of the first aspect, in a thirteenth possible implementation manner of the first aspect, if the current address book includes the contact name, and the user instructs to add the contact information as new contact information to the address book of the user equipment, the adding the contact information to the address book of the user equipment includes: adding, by the user equipment, the contact information as the new contact information to the address book of the user equipment, and adding a contact name distinguishing identifier.

A second aspect of the embodiments of the present disclosure provides user equipment. The user equipment includes a receiving module, configured to receive gesture information input by a user on a communication interface of an instant messaging application. The user equipment also includes a recognition module, configured to recognize, according to the gesture information, contact information in communication information corresponding to the communication interface. The user equipment also includes an adding module, configured to add the contact information to an address book of the user equipment.

With reference to the second aspect, the first possible implementation manner of the second aspect, the user equipment further includes a matching module, where the matching module is configured to: match the gesture information with preset gesture recognition information; and determine that the gesture information is the same as the preset gesture recognition information.

With reference to the second aspect or the first possible implementation manner of the second aspect, in a second possible implementation manner of the second aspect, the contact information includes at least a first information element and a second information element.

With reference to the second aspect or the second possible implementation manner of the second aspect, in a third possible implementation manner of the second aspect, if the communication information corresponding to the communication interface includes voice information, the recognition module is further configured to convert the voice information to text information before recognizing, according to the gesture information, the contact information in the communication information corresponding to the communication interface.

With reference to the second possible implementation manner of the second aspect, in a fourth possible implementation manner of the second aspect, the recognition module is specifically configured to: recognize the first information element in a range circled by or information tapped by the gesture information on the communication interface of the instant messaging application; recognize the second information element according to directions of a start position and a stop position of the gesture information on the communication interface of the instant messaging application relative to a position of the first information element; and use a combination of the first information element and the second information element as the contact information.

With reference to the second possible implementation manner of the second aspect, in a fifth possible implementation manner of the second aspect, the receiving module is specifically configured to receive first gesture information and second gesture information that are consecutively input by the user on the communication interface of the instant messaging application, where the first gesture information and the second gesture information are at an interval of a first preset time period.

With reference to the fifth possible implementation manner of the second aspect, in a sixth possible implementation manner of the second aspect, the recognition module is specifically configured to: recognize the first information element in a range circled by or information tapped by the first gesture information; recognize the second information element in a range circled by or information tapped by the second gesture information; and use a combination of the first information element and the second information element as the contact information.

With reference to the fifth possible implementation manner of the second aspect, in a seventh possible implementation manner of the second aspect, the recognition module is specifically configured to: recognize the first information element in a range circled by or information tapped by the first gesture information; recognize the second information element in a stop position of the second gesture information, where the second gesture information is to drag the first information element to a position of the second information element; and use a combination of the first information element and the second information element as the contact information.

With reference to the second possible implementation manner of the second aspect, in an eighth possible implementation manner of the second aspect, the receiving module is specifically configured to receive first gesture information, second gesture information, and third gesture information that are consecutively input by the user on the communication interface of the instant messaging application, where the second gesture information is used to associate the first gesture information and the third gesture information; and the recognition module is specifically configured to: recognize the first information element in a range circled by or information tapped by the first gesture information; recognize the second information element in a range circled by or information tapped by the third gesture information; and combine the first information element and the second information element as the contact information according to the second gesture information.

With reference to any one of the second to the eighth possible implementation manners of the second aspect, in a ninth possible implementation manner of the second aspect, the receiving module is further configured to receive information about a tap by the user on the communication interface on any information element in the contact information within a second preset time period, where the information about the tap is used to trigger the user equipment to add the contact information to the address book of the user equipment.

With reference to any one of the second to the ninth possible implementation manners of the second aspect, in a tenth possible implementation manner of the second aspect, the first information element is contact communication information, and the second information element is a contact name, where the contact communication information includes at least one of the following: a contact instant messaging account, a contact phone number, or a contact email.

With reference to the tenth possible implementation manner of the second aspect, in an eleventh possible implementation manner of the second aspect, the adding module is specifically configured to: determine whether the current address book includes the contact communication information, and if not, add the contact information to the address book of the user equipment.

With reference to the tenth possible implementation manner of the second aspect, in a twelfth possible implementation manner of the second aspect, the adding module is specifically configured to: determine whether the current address book includes the contact communication information; if the current address book does not include the contact communication information, determine whether the current address book includes the contact name; and if not, add the contact information to the address book of the user equipment, or if yes, display to the user whether to add the contact information to an existing contact notification, and add the contact information to the address book of the user equipment according to an instruction of the user.

With reference to the twelfth possible implementation manner of the second aspect, in a thirteenth possible implementation manner of the second aspect, if the current address book includes the contact name, and the user instructs to add the contact information as new contact information to the address book of the user equipment, the adding module is specifically configured to add the contact information as the new contact information to the address book of the user equipment, and add a contact name distinguishing identifier.

A third aspect of the embodiments of the present disclosure provides user equipment. The user equipment includes a touch control display screen and a processor, where a communication interface of an instant messaging application is displayed on the touch control display screen. The processor is configured to: receive gesture information input by a user on the communication interface of the instant messaging application; recognize, according to the gesture information, contact information in communication information corresponding to the communication interface; and add the contact information to an address book of the user equipment.

With reference to the third aspect, in a first possible implementation manner of the third aspect, the processor is further configured to: match the gesture information with preset gesture recognition information before recognizing, according to the gesture information, the contact information in the communication information corresponding to the communication interface; and determine that the gesture information is the same as the preset gesture recognition information.

With reference to the third aspect or the first possible implementation manner of the third aspect, in a second possible implementation manner of the third aspect, the contact information includes at least a first information element and a second information element.

With reference to any one of the third aspect to the second possible implementation manner of the third aspect, in a third possible implementation manner of the third aspect, if the communication information corresponding to the communication interface includes voice information, the processor is further configured to convert the voice information to text information before recognizing, according to the gesture information, the contact information in the communication information corresponding to the communication interface.

With reference to the second possible implementation manner of the third aspect, in a fourth possible implementation manner of the third aspect, the processor is specifically configured to: recognize the first information element in a range circled by or information tapped by the gesture information on the communication interface of the instant messaging application; recognize the second information element according to directions of a start position and a stop position of the gesture information on the communication interface of the instant messaging application relative to a position of the first information element; and use a combination of the first information element and the second information element as the contact information.

With reference to the second possible implementation manner of the third aspect, in a fifth possible implementation manner of the third aspect, the processor is specifically configured to receive first gesture information and second gesture information that are consecutively input by the user on the communication interface of the instant messaging application, where the first gesture information and the second gesture information are at an interval of a first preset time period.

With reference to the fifth possible implementation manner of the third aspect, in a sixth possible implementation manner of the third aspect, the processor is specifically configured to: recognize the first information element in a range circled by or information tapped by the first gesture information; recognize the second information element in a range circled by or information tapped by the second gesture information; and use a combination of the first information element and the second information element as the contact information.

With reference to the fifth possible implementation manner of the third aspect, in a seventh possible implementation manner of the third aspect, the processor is specifically configured to: recognize the first information element in a range circled by or information tapped by the first gesture information; recognize the second information element in a stop position of the second gesture information, where the second gesture information is to drag the first information element to a position of the second information element; and use a combination of the first information element and the second information element as the contact information.

With reference to the second possible implementation manner of the third aspect, in an eighth possible implementation manner of the third aspect, the processor is specifically configured to receive first gesture information, second gesture information, and third gesture information that are consecutively input by the user on the communication interface of the instant messaging application, where the second gesture information is used to associate the first gesture information and the third gesture information; and accordingly, the processor is specifically configured to: recognize the first information element in a range circled by or information tapped by the first gesture information; recognize the second information element in a range circled by or information tapped by the third gesture information; and combine the first information element and the second information element as the contact information according to the second gesture information.

With reference to any one of the second to the eighth possible implementation manners of the third aspect, in a ninth possible implementation manner of the third aspect, the processor is configured to: after recognizing, according to the gesture information, the contact information in the communication information corresponding to the communication interface, receive information about a tap by the user on the communication interface on any information element in the contact information within a second preset time period, where the information about the tap is used to trigger the processor to add the contact information to the address book of the user equipment.

With reference to any one of the second to the ninth possible implementation manners of the third aspect, in a tenth possible implementation manner of the third aspect, the first information element is contact communication information, and the second information element is a contact name, where the contact communication information includes at least one of the following: a contact instant messaging account, a contact phone number, or a contact email.

With reference to the tenth possible implementation manner of the third aspect, in an eleventh possible implementation manner of the third aspect, the processor is configured to: determine whether the current address book includes the contact communication information, and if not, add the contact information to the address book of the user equipment.

With reference to the tenth possible implementation manner of the third aspect, in a twelfth possible implementation manner of the third aspect, the processor is configured to: determine whether the current address book includes the contact communication information; if the current address book does not include the contact communication information, determine whether the current address book includes the contact name; and if not, add the contact information to the address book of the user equipment, or if yes, display to the user whether to add the contact information to an existing contact notification, and add the contact information to the address book of the user equipment according to an instruction of the user.

With reference to the twelfth possible implementation manner of the third aspect, in a thirteenth possible implementation manner of the third aspect, if the current address book includes the contact name, and the user instructs to add the contact information as new contact information to the address book of the user equipment, the processor adds the contact information as the new contact information to the address book of the user equipment, and adds a contact name distinguishing identifier.

According to the method for adding contact information and the user equipment that are provided in the embodiments of the present disclosure, UE receives gesture information input by a user on a communication interface of an instant messaging application, recognizes contact information in communication information according to the gesture information, and adds the contact information to an address book of the UE, so that contact information is automatically recognized according to the gesture information input by the user and is automatically added to the address book, thereby improving efficiency of adding the contact information in the communication information of the instant messaging application to the address book, improving man-machine interaction intelligence, and also improving user experience.

A fourth aspect of the embodiments of the present disclosure provides a method for adding contact information. The method includes recognizing, by user equipment, contact information in communication information of an instant messaging application. The method also includes determining, by the user equipment, whether a communication record of the instant messaging application includes information conforming to a first preset format, where the information conforming to the first preset format is used to identify adding of the contact information. The method also includes, if the communication record of the instant messaging application includes the information conforming to the first preset format, adding or updating, by the user equipment, the contact information to an address book of the user equipment.

With reference to the fourth aspect, in a first possible implementation manner of the fourth aspect, the method further includes: if the communication record of the instant messaging application does not include the information conforming to the first preset format, determining, by the user equipment, whether the instant messaging application receives, within a preset time period, the information conforming to the first preset format; and if the instant messaging application receives, within the preset time period, the information conforming to the first preset format, adding or updating, by the user equipment, the contact information to the address book of the user equipment when the instant messaging application receives the information conforming to the first preset format; or if the instant messaging application does not receive, within the preset time period, the information conforming to the first preset format, prompting, by the user equipment, a user whether to add the contact information.

With reference to the first possible implementation manner of the fourth aspect, in a second possible implementation manner of the fourth aspect, the contact information includes at least a first information element and a second information element.

With reference to the second possible implementation manner of the fourth aspect, in a third possible implementation manner of the fourth aspect, before the recognizing, by user equipment, contact information in communication information of an instant messaging application, the method further includes: receiving, by the user equipment, information that conforms to a second preset format and that is input by the user, where the information conforming to the second preset format is used to identify recognition of the contact information.

With reference to the second or the third possible implementation manner of the fourth aspect, in a fourth possible implementation manner of the fourth aspect, the information conforming to the first preset format includes a second information element; the recognizing, by user equipment, contact information in communication information of an instant messaging application includes: recognizing, by the user equipment, a first information element in the communication information of the instant messaging application; and the adding or updating, by the user equipment, the contact information to an address book of the user equipment includes: adding or updating, by the user equipment, a combination of the first information element and the second information element as the contact information to the address book of the user equipment.

With reference to the fourth possible implementation manner of the fourth aspect, in a fifth possible implementation manner of the fourth aspect, the recognizing, by the user equipment, a first information element in the communication information of the instant messaging application includes: recognizing, by the user equipment, at least two first information elements in the communication information of the instant messaging application; displaying, by the user equipment, the at least two first information elements to the user; and receiving, by the user equipment, one first information element selected from the at least two first information elements by the user, and using the first information element selected by the user as a to-be-added or to-be-updated first information element.

With reference to the fifth possible implementation manner of the fourth aspect, in a sixth possible implementation manner of the fourth aspect, the using, by the user equipment, the first information element selected by the user as a to-be-added or to-be-updated first information element includes: switching, by the user equipment, a current display interface of the instant messaging application to a position of the first information element selected by the user, so that the user determines, according to an information record of the position, whether the selected first information element is the to-be-added or to-be-updated first information element; and receiving, by the user equipment, confirmation information input by the user, and using the first information element selected by the user as the to-be-added or to-be-updated first information element; or receiving, by the user equipment, denial information input by the user, and displaying the at least two first information elements to the user again.

With reference to any one of the second to the fifth possible implementation manners of the fourth aspect, in a sixth possible implementation manner of the fourth aspect, the first information element is contact communication information, and the second information element is a contact name, where the contact communication information includes at least one of the following: a contact instant messaging account, a contact phone number, or a contact email.

With reference to the sixth possible implementation manner of the fourth aspect, in a seventh possible implementation manner of the fourth aspect, the adding or updating, by the user equipment, the contact information to an address book of the user equipment includes: determining, by the user equipment, whether the current address book includes the contact communication information, and if not, adding or updating the contact information to the address book of the user equipment.

With reference to the sixth possible implementation manner of the fourth aspect, in an eighth possible implementation manner of the fourth aspect, the adding or updating, by the user equipment, the contact information to an address book of the user equipment includes: determining, by the user equipment, whether the current address book includes the contact communication information; and if the current address book does not include the contact communication information, determining whether the current address book includes the contact name; and if not, adding the contact information to the address book of the user equipment, or if yes, displaying to the user whether to add or update the contact information to an existing contact notification, and adding or updating the contact information to the address book of the user equipment according to an instruction of the user.

With reference to the eighth possible implementation manner of the fourth aspect, in a ninth possible implementation manner of the fourth aspect, if the current address book includes the contact name, and the user instructs to add the contact information as new contact information to the address book of the user equipment, the adding the contact information to the address book of the user equipment includes: adding, by the user equipment, the contact information as the new contact information to the address book of the user equipment, and adding a contact name distinguishing identifier.

A fifth aspect of the embodiments of the present disclosure provides user equipment. The user equipment includes a recognition module, configured to recognize contact information in communication information of an instant messaging application. The user equipment also includes a determining module, configured to determine whether a communication record of the instant messaging application includes information conforming to a first preset format, where the information conforming to the first preset format is used to identify adding of the contact information. The user equipment also includes an update module, configured to: if the determining module determines that the communication record of the instant messaging application includes the information conforming to the first preset format, add or update the contact information to an address book of the user equipment.

With reference to the fifth aspect, in a first possible implementation manner of the fifth aspect, if the communication record of the instant messaging application does not include the information conforming to the first preset format, the determining module is further configured to determine whether the instant messaging application receives, within a preset time period, the information conforming to the first preset format, and accordingly, if the determining module determines that the instant messaging application receives, within the preset time period, the information conforming to the first preset format, the update module adds or updates the contact information to the address book of the user equipment when the instant messaging application receives the information conforming to the first preset format; and if the determining module determines that the instant messaging application does not receive, within the preset time period, the information conforming to the first preset format, the update module prompts a user whether to add the contact information.

With reference to the first possible implementation manner of the fifth aspect, in a second possible implementation manner of the fifth aspect, the contact information includes at least a first information element and a second information element.

With reference to the second possible implementation manner of the fifth aspect, in a third possible implementation manner of the fifth aspect, the user equipment further includes: a receiving module, configured to receive information that conforms to a second preset format and that is input by the user, where the information conforming to the second preset format is used to identify recognition of the contact information.

With reference to the second or the third possible implementation manner of the fifth aspect, in a fourth possible implementation manner of the fifth aspect, if the information conforming to the first preset format includes the second information element, the recognition module is specifically configured to recognize the first information element in the communication information of the instant messaging application; and the update module is specifically configured to add or update a combination of the first information element and the second information element as the contact information to the address book of the user equipment.

With reference to the fourth possible implementation manner of the fifth aspect, in a fifth possible implementation manner of the fifth aspect, the recognition module is specifically configured to: recognize at least two first information elements in the communication information of the instant messaging application; display the at least two first information elements to the user; and receive one first information element selected from the at least two first information elements by the user, and use the first information element selected by the user as a to-be-added or to-be-updated first information element.

With reference to the fifth possible implementation manner of the fifth aspect, in a sixth possible implementation manner of the fifth aspect, the recognition module is specifically configured to switch a current display interface of the instant messaging application to a position of the first information element selected by the user, so that the user determines, according to an information record of the position, whether the selected first information element is the to-be-added or to-be-updated first information element; and receive confirmation information input by the user, and use the first information element selected by the user as the to-be-added or to-be-updated first information element; or receive denial information input by the user, and display the at least two first information elements to the user again.

With reference to any one of the second to the fifth possible implementation manners of the fifth aspect, in a sixth possible implementation manner of the fifth aspect, the first information element is contact communication information, and the second information element is a contact name, where the contact communication information includes at least one of the following: a contact instant messaging account, a contact phone number, or a contact email.

With reference to the sixth possible implementation manner of the fifth aspect, in a seventh possible implementation manner of the fifth aspect, the update module is specifically configured to: determine whether the current address book includes the contact communication information, and if not, add or update the contact information to the address book of the user equipment.

With reference to the sixth possible implementation manner of the fifth aspect, in an eighth possible implementation manner of the fifth aspect, the update module is specifically configured to: determine whether the current address book includes the contact communication information; if the current address book does not include the contact communication information, determine whether the current address book includes the contact name; and if not, add the contact information to the address book of the user equipment, or if yes, display to the user whether to add or update the contact information to an existing contact notification, and add or update the contact information to the address book of the user equipment according to an instruction of the user.

With reference to the eighth possible implementation manner of the fifth aspect, in a ninth possible implementation manner of the fifth aspect, if the current address book includes the contact name, and the user instructs to add the contact information as new contact information to the address book of the user equipment, the update module is specifically configured to add the contact information as the new contact information to the address book of the user equipment, and add a contact name distinguishing identifier.

A sixth aspect of the embodiments of the present disclosure provides user equipment, including: a display screen and a processor, where a communication interface of an instant messaging application is displayed on the display screen. The processor is configured to: recognize contact information in communication information of the instant messaging application; determine whether a communication record of the instant messaging application includes information conforming to a first preset format, where the information conforming to the first preset format is used to identify adding of the contact information; and if the communication record of the instant messaging application includes the information conforming to the first preset format, add or update the contact information to an address book of the user equipment.

With reference to the sixth aspect, in a first possible implementation manner of the sixth aspect, if the communication record of the instant messaging application does not include the information conforming to the first preset format, the processor is further configured to determine whether the instant messaging application receives, within a preset time period, the information conforming to the first preset format, and accordingly, if the instant messaging application receives, within the preset time period, the information conforming to the first preset format, the processor is specifically configured to add or update the contact information to the address book of the user equipment when the instant messaging application receives the information conforming to the first preset format; and if the instant messaging application does not receive, within the preset time period, the information conforming to the first preset format, the processor is further configured to prompt a user whether to add the contact information.

With reference to the first possible implementation manner of the sixth aspect, in a second possible implementation manner of the sixth aspect, the contact information includes at least a first information element and a second information element.

With reference to the second possible implementation manner of the sixth aspect, in a third possible implementation manner of the sixth aspect, the processor is further configured to: before recognizing the contact information in the communication information of the instant messaging application, receive information that conforms to a second preset format and that is input by the user, where the information conforming to the second preset format is used to identify recognition of the contact information.

With reference to the second or the third possible implementation manner of the sixth aspect, in a fourth possible implementation manner of the sixth aspect, if the information conforming to the first preset format includes the second information element, the processor is specifically configured to recognize the first information element in the communication information of the instant messaging application; and accordingly, the processor adds or updates the contact information to the address book of the user equipment, and specifically: adds or updates a combination of the first information element and the second information element as the contact information to the address book of the user equipment.

With reference to the fourth possible implementation manner of the sixth aspect, in a fifth possible implementation manner of the sixth aspect, the processor is configured to: recognize at least two first information elements in the communication information of the instant messaging application; display the at least two first information elements to the user; and receive one first information element selected from the at least two first information elements by the user, and use the first information element selected by the user as a to-be-added or to-be-updated first information element.

With reference to the fifth possible implementation manner of the sixth aspect, in a sixth possible implementation manner of the sixth aspect, the processor is specifically configured to switch a current display interface of the instant messaging application to a position of the first information element selected by the user, so that the user determines, according to an information record of the position, whether the selected first information element is the to-be-added or to-be-updated first information element; and receive confirmation information input by the user, and use the first information element selected by the user as the to-be-added or to-be-updated first information element; or receive denial information input by the user, and display the at least two first information elements to the user again.

With reference to any one of the second to the fifth possible implementation manners of the sixth aspect, in a seventh possible implementation manner of the sixth aspect, the first information element is contact communication information, and the second information element is a contact name, where the contact communication information includes at least one of the following: a contact instant messaging account, a contact phone number, or a contact email.

With reference to the sixth possible implementation manner of the sixth aspect, in a seventh possible implementation manner of the sixth aspect, the processor is specifically configured to: determine whether the current address book includes the contact communication information, and if not, add or update the contact information to the address book of the user equipment.

With reference to the sixth possible implementation manner of the sixth aspect, in an eighth possible implementation manner of the sixth aspect, the processor is specifically configured to: determine whether the current address book includes the contact communication information; if the current address book does not include the contact communication information, determine whether the current address book includes the contact name; and if not, add the contact information to the address book of the user equipment, or if yes, display to the user whether to add or update the contact information to an existing contact notification, and add or update the contact information to the address book of the user equipment according to an instruction of the user.

With reference to the eighth possible implementation manner of the sixth aspect, in a ninth possible implementation manner of the sixth aspect, if the current address book includes the contact name, and the user instructs to add the contact information as new contact information to the address book of the user equipment, the processor is specifically configured to add the contact information as the new contact information to the address book of the user equipment, and add a contact name distinguishing identifier.

According to the method for adding contact information and the user equipment that are provided in the embodiments of the present disclosure, UE automatically recognizes contact information in communication information of an instant messaging application, and determines whether a communication record of the instant messaging application includes information conforming to a first preset format; if the communication record includes the information conforming to the first preset format, the UE adds or updates the contact information to an address book of the UE, so that the UE can automatically recognize the contact information in the communication information of the instant messaging application and automatically complete adding or updating of the contact information according to the information conforming to the preset format, thereby improving efficiency of adding the contact information, and also improving user experience.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, an instant messaging application refers to a fixed instant messaging application, and a communication interface of the instant messaging application refers to an interface on which a user performs an instant messaging conversation with a particular contact, or an interface of instant messaging conversations of a particular group. Likewise, communication information of the instant messaging application also refers to information exchanged in a process in which a user performs an instant messaging conversation with a particular contact, or information exchanged in a process of instant messaging conversations of a particular group.

Figure 1:
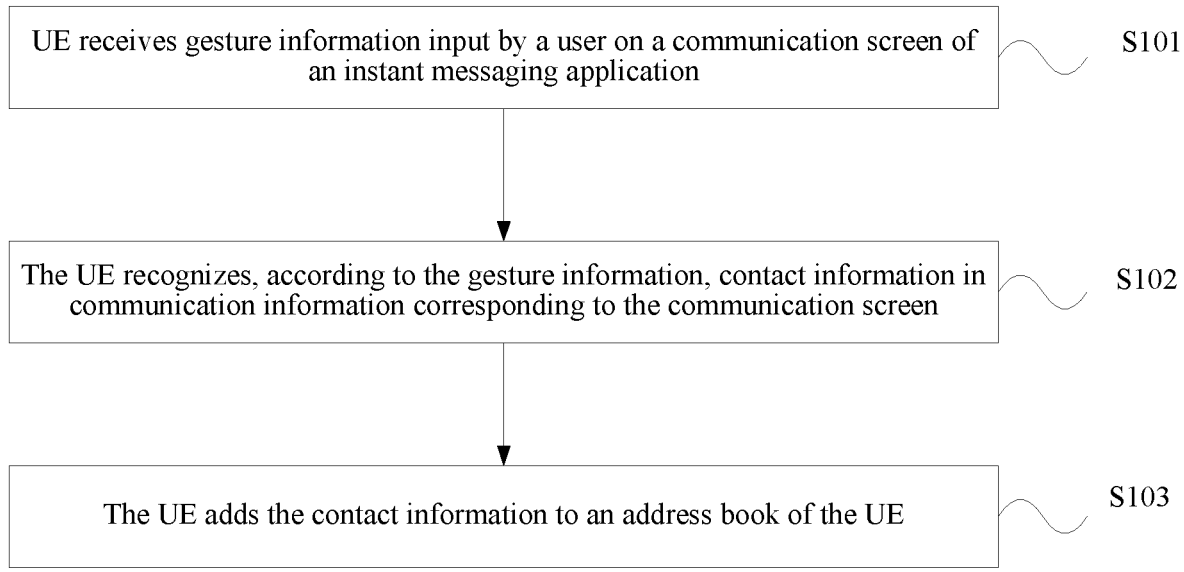
FIG. 1 is a schematic flowchart of Embodiment 1 of a method for adding contact information according to the present disclosure.

FIG. 1 is a schematic flowchart of Embodiment 1 of a method for adding contact information according to the present disclosure. As shown in FIG. 1, the method includes the following steps.

S101: UE receives gesture information input by a user on a communication interface of an instant messaging application.

The instant messaging application may include: WeChat, QQ, AliWangWang, WhatsApp, KakaoTalk, Line, or the like.

Certainly, this embodiment of the present disclosure is not limited to instant messaging, and may also be applied to a short message service message, and other social applications, such as RenRen and Weibo.

The UE in this embodiment may be a terminal device such as a mobile phone, a tablet computer, or a wearable device that has a touchscreen function.

S102: The UE recognizes, according to the gesture information, contact information in communication information corresponding to the communication interface.

If the user intends to add contact information obtained in an instant messaging process to an address book of the UE, the user inputs gesture information on the communication interface. The gesture information may be a circle that circles the contact information, or may be a straight line that indicates a direction of the contact information, or may be a dot, that is, a tap on the contact information. Further, the UE may recognize, according to the gesture information, the contact information in the communication information corresponding to the communication interface.

S103: The UE adds the contact information to an address book of the UE.

For example, if Li Ming and Xiao Fang are chatting on WeChat, Li Ming intends to tell Xiao Fang his own phone number, and sends a message "Li Ming: 9999888" on WeChat to Xiao Fang, Xiao Fang circles the message "Li Ming: 9999888" on a WeChat chatting interface with Li Ming, and the UE recognizes contact information including a name: Li Ming, and a number: 9999888, and then the UE automatically adds the recognized contact information to an address book.

In this embodiment, the contact information may include any contact information element or any combination of the following: a phone number, a QQ number, an email address, a WeChat number, a name, a nickname, or the like, but is not limited thereto.

In this embodiment, UE receives gesture information input by a user on a communication interface of an instant messaging application, recognizes contact information in communication information according to the gesture information, and adds the contact information to an address book of the UE, so that contact information is automatically recognized according to the gesture information input by the user and is automatically added to the address book, thereby improving efficiency of adding the contact information in the communication information of the instant messaging application to the address book, improving man-machine interaction intelligence, and also improving user experience.

In another embodiment, before the UE recognizes, according to the gesture information, the contact information in the communication information corresponding to the communication interface, the UE matches the gesture information with preset gesture recognition information. Further, the UE determines that the gesture information is the same as the preset gesture recognition information. That is, when the gesture information is the same as the preset gesture recognition information, the UE is triggered to recognize the contact information in the communication information corresponding to the communication interface.

It should be noted that, the user may input a preset to-be-recognized gesture on a gesture information setting interface of the UE in advance, and when subsequently the user inputs the same gesture on the communication interface of the instant messaging application, the UE is triggered to recognize the contact information in the communication information corresponding to the communication interface. Alternatively, the UE may already prestore preset gesture recognition information, and provided that the user inputs the same gesture on the communication interface of the instant messaging application, the UE is triggered to recognize the contact information in the communication information corresponding to the communication interface.

In another embodiment, the contact information includes at least a first information element and a second information element. That is, generally, one piece of contact information stored in an address book generally includes at least two information elements, such as a phone number, a contact name, and an email address.

Optionally, before adding edited to-be-added contact information to the address book, the UE may display the edited to-be-added contact information to the user to view, and after confirming that the contact information is correct, the user chooses to add the contact information. Specifically, when the to-be-added contact information is displayed to the user to view, a "confirm" control is also displayed, and if the user considers that there is no problem, the user touches the "confirm" control. Certainly, the present disclosure is not limited thereto.

At present, to improve user experience, many instant messaging applications provide a function of sending voice information. On the basis of the foregoing embodiment, if the communication information corresponding to the communication interface includes voice information, before the UE recognizes, according to the gesture information, the contact information in the communication information corresponding to the communication interface, the UE converts the voice information to text information.

In a specific implementation process, not all voice information in a communication process needs to be converted to text information. If the user knows in the communication process which piece of information includes contact information, the user indicates this piece of information by using gesture information, so that the UE may convert, to text information, the voice information indicated on the communication interface by the gesture information, and then the UE recognizes the contact information included in the text information.

Figure 2:
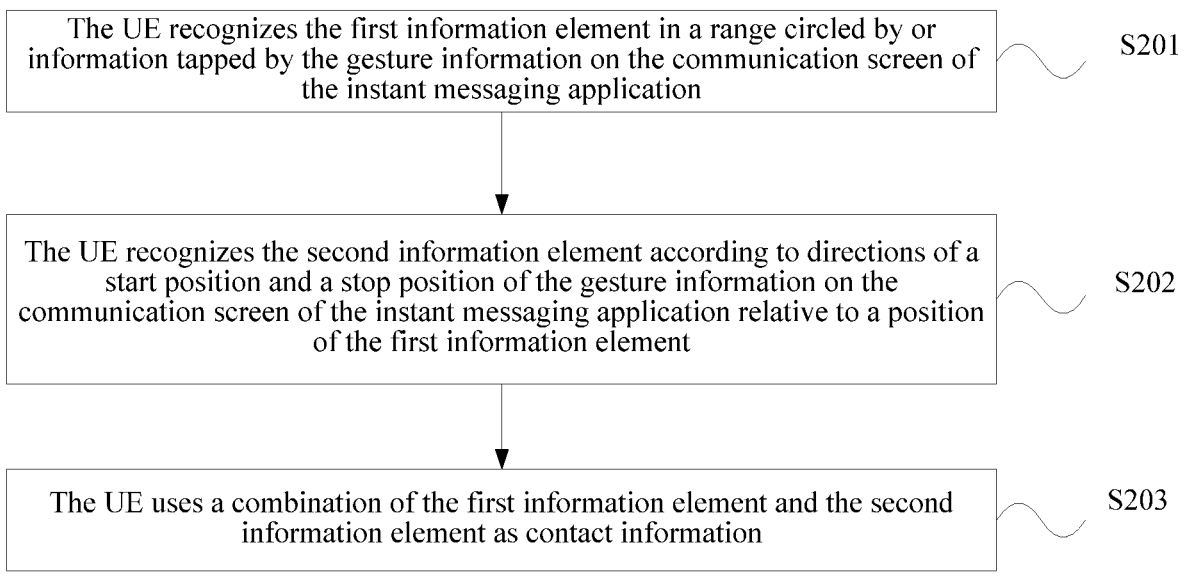
FIG. 2 is a schematic flowchart of Embodiment 2 of a method for adding contact information according to the present disclosure.

FIG. 2 is a schematic flowchart of Embodiment 2 of a method for adding contact information according to the present disclosure. On the basis of the foregoing embodiment, as shown in FIG. 2, the recognizing, by the UE, according to the gesture information, contact information in communication information corresponding to the communication interface includes the following steps.

S201: The UE recognizes the first information element in a range circled by or information tapped by the gesture information on the communication interface of the instant messaging application.

S202: The UE recognizes the second information element according to directions of a start position and a stop position of the gesture information on the communication interface of the instant messaging application relative to a position of the first information element.

That is, according to the directions of the start position and the stop position of the gesture information on the communication interface of the instant messaging application relative to the position of the first information element, the second information element may be further searched for and recognized according to a preset rule. For example, if both the start position and the stop position of the gesture information on the interface of the instant messaging application are above the first information element, the second information element is searched for and recognized above information that includes the first information element.

S203: The UE uses a combination of the first information element and the second information element as the contact information.

For example, the communication information of the instant messaging application includes a first information element and a second information element, one of which may be first circled. Assuming that information including a first information element is after information including a second information element, the first information element may be first circled. However, when the first information element is circled, a start position and a stop position of a gesture may be determined according to a preset rule, and subsequently, the UE recognizes the second information element according to the preset rule. For example, if both a start position and a stop position of gesture information are above the circled information, the UE searches for and recognizes the second information element above the circled information. Alternatively, if both a start position and a stop position of gesture information are below the circled information, the UE searches for and recognizes the second information element below the circled information. Alternatively, if both a start position and a stop position of gesture information are on a side (left side or right side) of the circled information, a nickname of a communication friend corresponding to the current communication interface is used as a second information element. If it is group chatting, a nickname of a friend who sends the second information element is used as a second information element. Certainly, the present disclosure is not limited thereto.

It should be noted that, the start position and the stop position of the gesture information may be or may not be overlapped.

Figure 3:
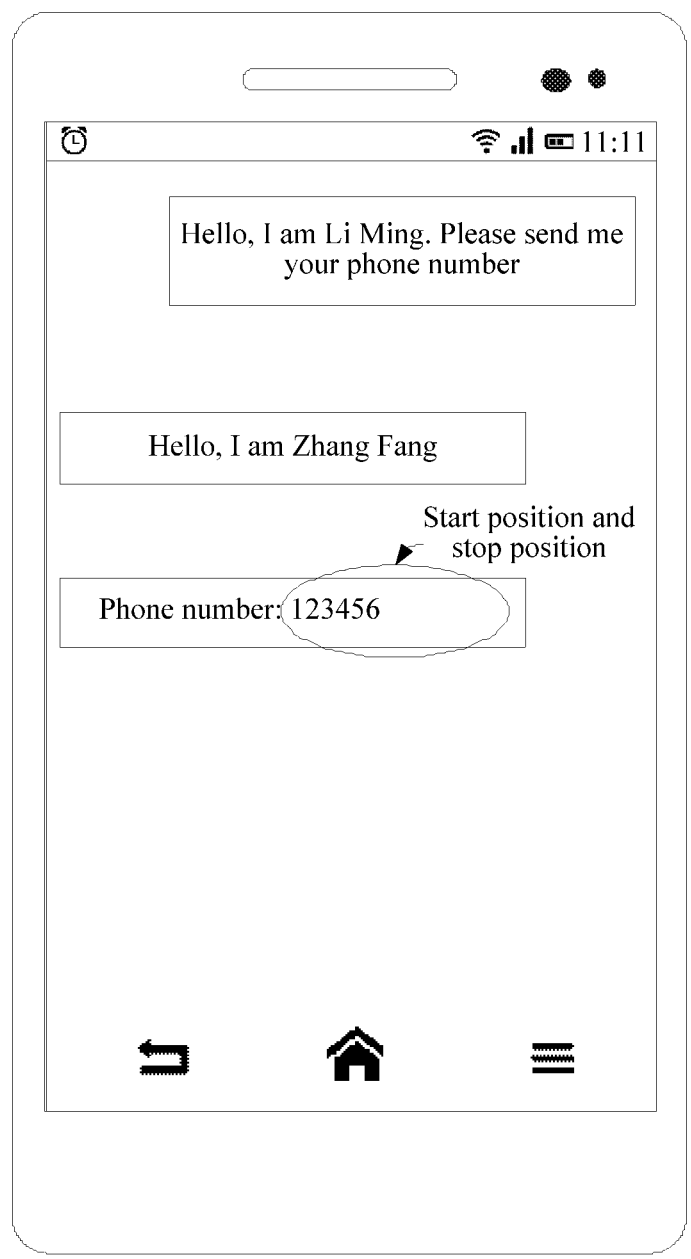
FIG. 3 is a schematic diagram of a user interface of Embodiment 3 of a method for adding contact information according to the present disclosure.

FIG. 3 is a schematic diagram of a user interface of Embodiment 3 of a method for adding contact information according to the present disclosure. In FIG. 3, a communication interface on which two users communicate with each other in an instant messaging application is used as an example. The interface is a communication interface on UE of a first user Li Ming, and a second user is Zhang Fang. Communication information includes: Li Ming says to Zhang Fang: "Hello, I am Li Ming. Please send me your phone number", and Zhang Fang replies with two pieces of information: the first one is "Hello, I am Zhang Fang", and the second one is "Phone number: 123456". Afterwards, Li Ming intends to add the phone number of Zhang Fang to an address book. Therefore, Li Ming inputs gesture information on the interface on which Li Ming chats with Zhang Fang, that is, circles "123456" in the information sent by Zhang Fang. The UE recognizes that a first information element is the phone number "123456". When Li Ming circles "123456", both a start position and a stop position of the gesture information are above the information "123456" (a position indicated by an arrow in the figure is the start position and the stop position of the gesture). According to a preset rule, the UE searches for and recognizes a second information element in the communication information above "123456", and further the UE recognizes "Zhang Fang", and uses "Zhang Fang" as the second information element, that is, a contact name.

For another example, assuming that both the start position and the stop position of the gesture information are at the left side of the information "123456", according to a preset rule, a nickname of the user is used as a second information element. If the nickname set by Zhang Fang in the instant messaging application is "Xiao Fang", the UE uses "Xiao Fang" as the second information element.

Figure 4:
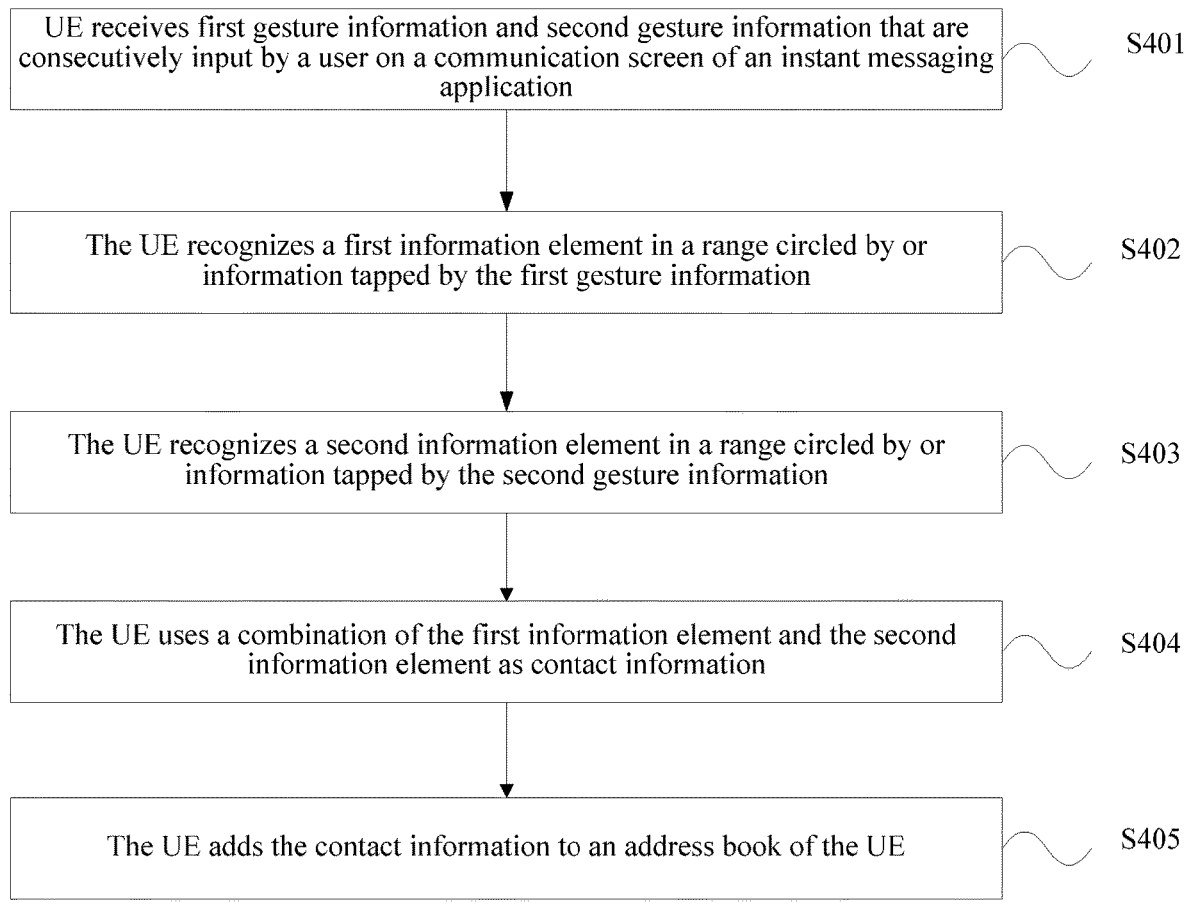
FIG. 4 is a schematic flowchart of Embodiment 4 of a method for adding contact information according to the present disclosure.

FIG. 4 is a schematic flowchart of Embodiment 4 of a method for adding contact information according to the present disclosure. As shown in FIG. 4, the method includes the following steps.

S401: UE receives first gesture information and second gesture information that are consecutively input by a user on a communication interface of an instant messaging application.

The consecutively input first gesture information and second gesture information specifically refer to that the user inputs the second gesture information within a first preset time period after inputting the first gesture information. That is, the first gesture information and the second gesture information are at an interval of a first preset time period.

S402: The UE recognizes a first information element in a range circled by or information tapped by the first gesture information.

That is, the user may draw a circle on an interface to circle an information element, or may tap at the position of an information element.

S403: The UE recognizes a second information element in a range circled by or information tapped by the second gesture information.

S404: The UE uses a combination of the first information element and the second information element as contact information.

S405: The UE adds the contact information to an address book of the UE.

That is, in this embodiment, the user circles or taps the first information element and the second information element separately by using two consecutive pieces of gesture information, for the UE to perform recognition.

Certainly, the first gesture information and the second gesture information are merely a general reference. The present disclosure is not limited thereto. Multiple pieces of gesture information may be consecutively used to separately circle or tap multiple information elements to form more complete contact information.

Using an interface shown in FIG. 3 as an example, assuming that Li Ming consecutively draws two circles (not shown) on the interface, where the first circle circles "123456", and the second circle circles "Zhang Fang". The UE first recognizes the phone number "123456", and then recognizes the name "Zhang Fang". Then, "Zhang Fang" and "123456" are combined to form one piece of contact information, and the contact information is added to the address book.

Figure 5:
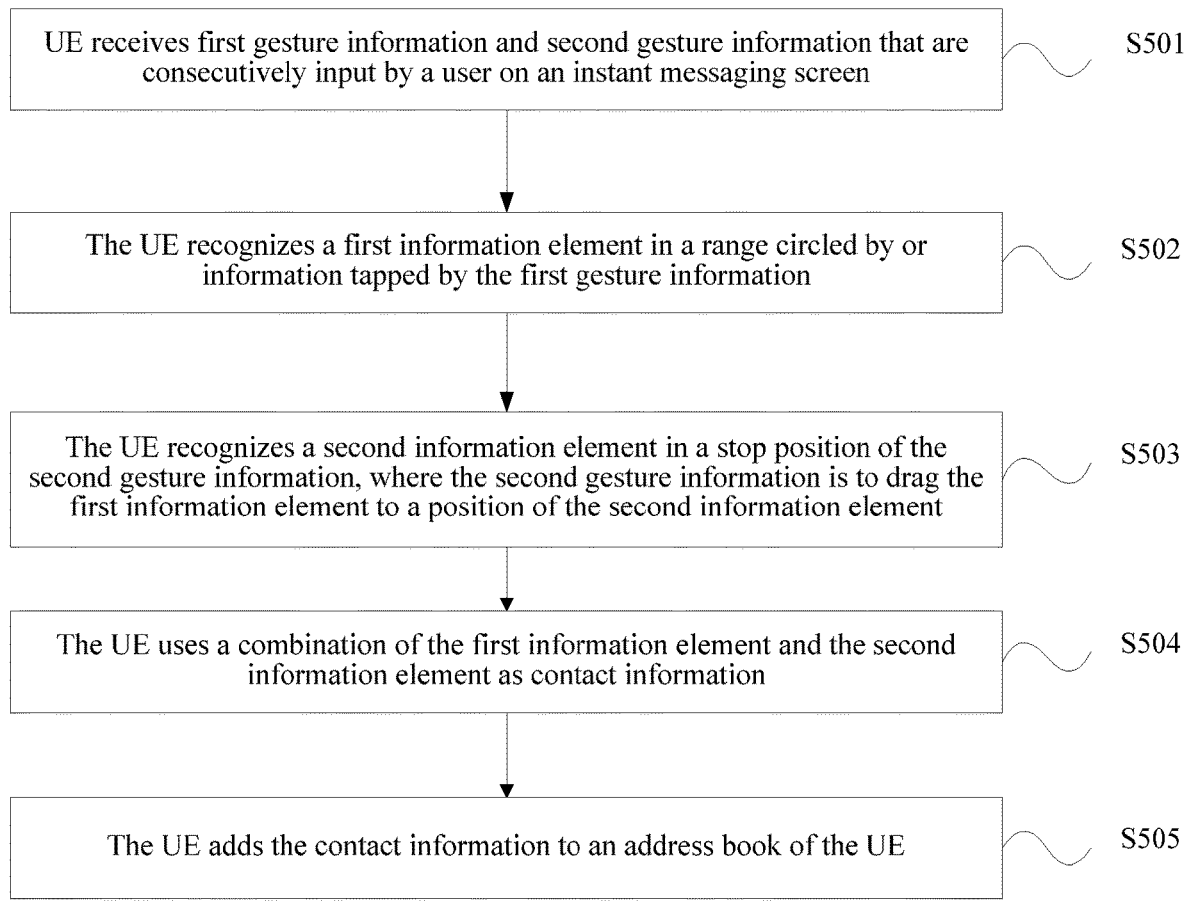
FIG. 5 is a schematic flowchart of Embodiment 5 of a method for adding contact information according to the present disclosure.

FIG. 5 is a schematic flowchart of Embodiment 5 of a method for adding contact information according to the present disclosure. As shown in FIG. 5, the method includes the following steps.

S501: UE receives first gesture information and second gesture information that are consecutively input by a user on the interface of the instant messaging application.

S502: The UE recognizes a first information element in a range circled by or information tapped by the first gesture information.

S503: The UE recognizes a second information element in a stop position of the second gesture information, where the second gesture information is to drag the first information element to a position of the second information element.

In a specific implementation process, the first information element may be actually dragged to the position of the second information element, that is, the first information element is moved; or a position of the first information element may be used as a start point of the second gesture information, a position of the second information element is used as an end point of the second gesture information, the first information element is not moved in this process, and dragging is only virtual.

However, the present disclosure is not limited thereto, and the second information element may be dragged to a position of the first information element.

S504: The UE uses a combination of the first information element and the second information element as contact information.

In this embodiment, when the second gesture information drags the first information element to the position of the second information element, the UE may be triggered to use a combination of the first information element and the second information element as the contact information.

S505: The UE adds the contact information to an address book of the UE.

Using an interface shown in FIG. 3 as an example, after Li Ming first circles "123456", the UE recognizes the phone number "123456", and then Li Ming taps and holds "123456" on the interface, and drags "123456" to a position of "Zhang Fang" in a previous piece of information. The UE recognizes the name "Zhang Fang", and the UE is triggered to combine "123456" and "Zhang Fang" as one piece of contact information, and add the contact information to the address book of the UE.

Figure 6:
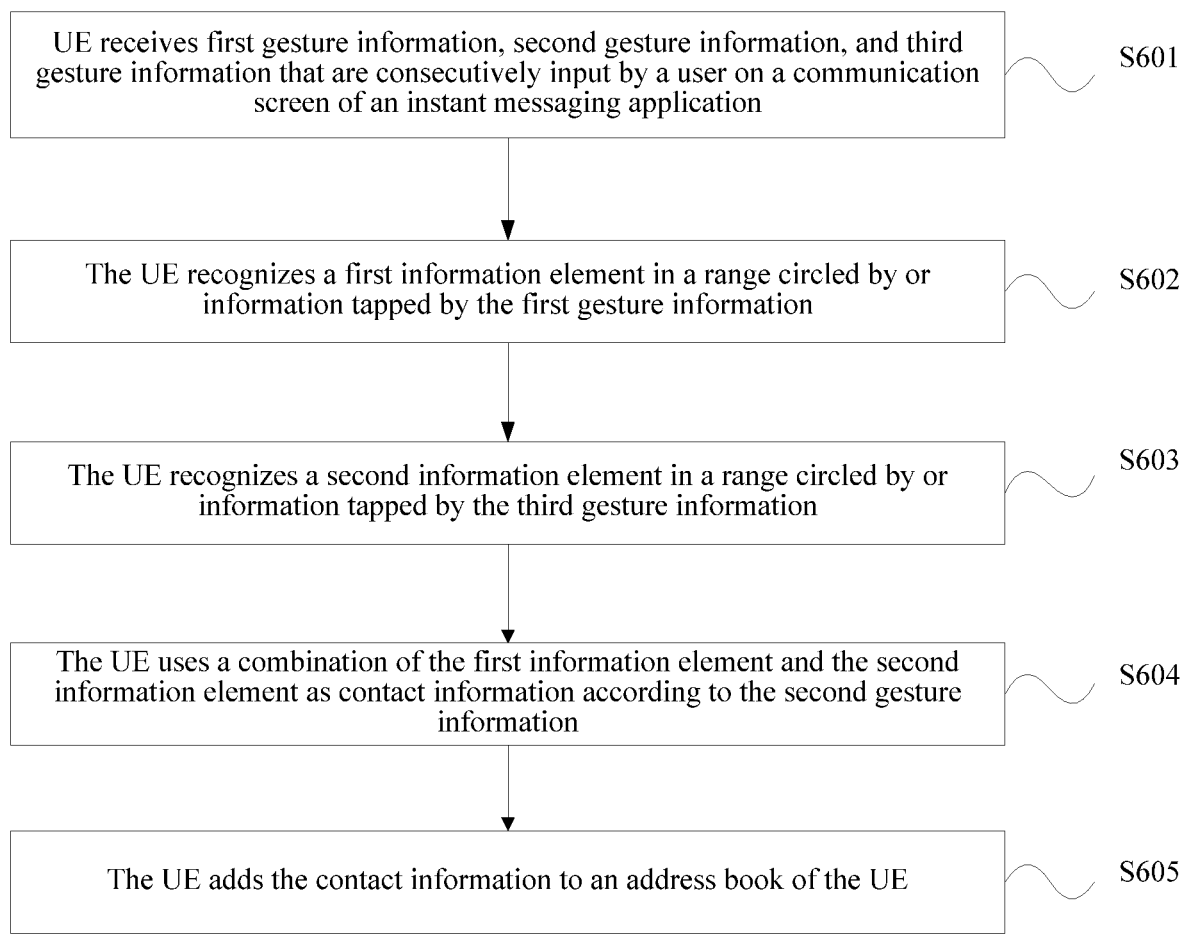
FIG. 6 is a schematic flowchart of Embodiment 6 of a method for adding contact information according to the present disclosure.

FIG. 6 is a schematic flowchart of Embodiment 6 of a method for adding contact information according to the present disclosure. As shown in FIG. 6, the method includes the following steps.

S601: UE receives first gesture information, second gesture information, and third gesture information that are consecutively input by a user on a communication interface of an instant messaging application.

The second gesture information is used to associate the first gesture information and the third gesture information;

The consecutively input first gesture information, second gesture information, and third gesture information may refer to that the second gesture information continues to be input within a preset time period after the first gesture information ends, and the third gesture information continues to be input within a preset time period after the second gesture information ends.

S602: The UE recognizes a first information element in a range circled by or information tapped by the first gesture information.

S603: The UE recognizes a second information element in a range circled by or information tapped by the third gesture information.

S604: The UE combines the first information element and the second information element as contact information according to the second gesture information.

The first gesture information, the second gesture information, and the third gesture information may be completed by the user at one stroke. For example, after circling the first information element, the user may extend the gesture from an end position of the circle directly to a position of the second information element, and circle the second information element.

S605: The UE adds the contact information to an address book of the UE.

Figure 7:
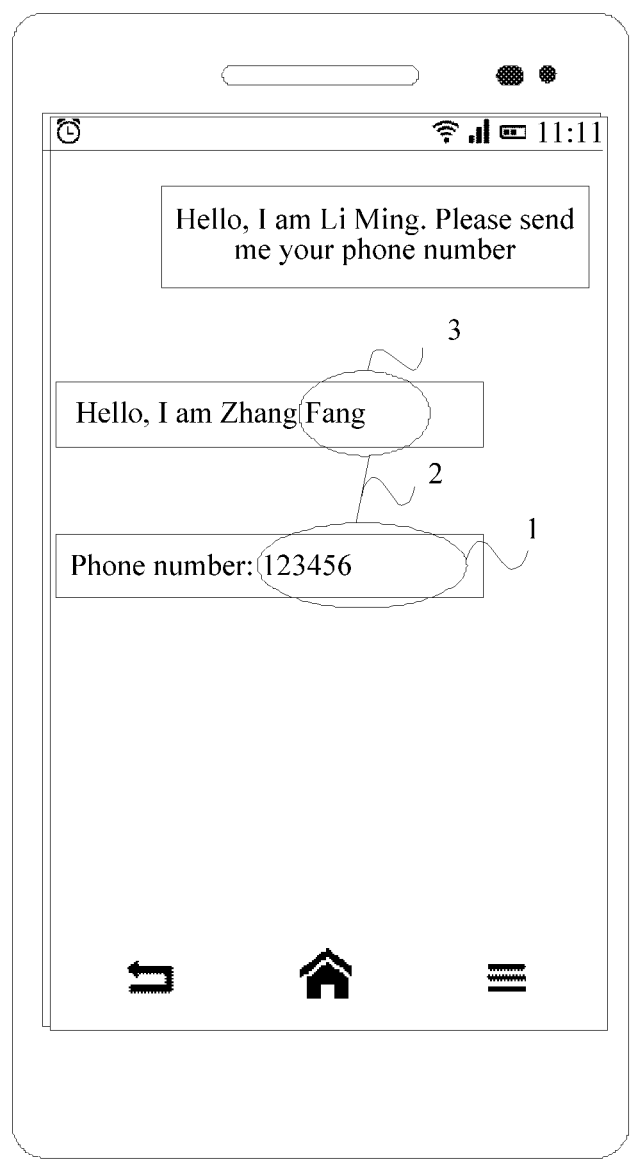
FIG. 7 is a schematic diagram of a user interface of Embodiment 7 of a method for adding contact information according to the present disclosure.

FIG. 7 is a schematic diagram of a user interface of Embodiment 7 of a method for adding contact information according to the present disclosure. In FIG. 7, an interface on which two users communicate with each other in an instant messaging application is used as an example. The interface is a communication interface on UE of a first user Li Ming, and a second user is Zhang Fang. 1, 2, and 3 identified in FIG. 7 identify first gesture information, second gesture information, and third gesture information respectively. Communication information includes: Li Ming says to Zhang Fang: "Hello, I am Li Ming. Please send me your phone number", and Zhang Fang replies with two pieces of information: the first one is "Hello, I am Zhang Fang", and the second one is "Phone number: 123456". Afterwards, Li Ming intends to add the phone number of Zhang Fang to an address book. Therefore, Li Ming inputs gesture information on the interface on which Li Ming chats with Zhang Fang, that is, circles "123456" in the information sent by Zhang Fang, and continues to extend, with the finger not leaving the screen of the UE, to a position of "Zhang Fang", to circle "Zhang Fang". The UE recognizes that a first information element is the phone number "123456", and further the UE recognizes "Zhang Fang", uses "Zhang Fang" as a second information element, and associates "123456" with "Zhang Fang" as one piece of contact information.

On the basis of the foregoing embodiment, in another embodiment, if the information in the instant messaging includes only the first information element, the UE may prompt the user whether to input the second information element, and the user may select to input the second information element or select to skip inputting the second information element but directly perform adding.

Further, to avoid a misoperation, after the UE recognizes, according to the gesture information, the contact information in the communication information corresponding to the communication interface, the UE receives information about a tap by the user on the interface of the instant messaging application on any information element in the contact information within a second preset time period, where the information about the tap is used to trigger the UE to add the contact information to the address book of the UE. That is, in this embodiment, after the UE recognizes the contact information, if the user taps any information element in the contact information within a preset time period, the user immediately adds the contact information to the address book; otherwise, the user gives up adding the contact information.

For example, if to-be-added contact information includes two information elements: "Zhang Fang" and "123456", the user may randomly tap "Zhang Fang" or tap "123456" on the interface to trigger the UE to add the contact information to the address book.

Further, for example, the first information element is contact communication information, and the second information element is a contact name. The contact communication information includes at least one of the following: a contact instant messaging account, a contact phone number, a contact email, or the like. The contact instant messaging account may refer to a QQ number, a WeChat number, or the like. The contact name may refer to a contact name or a contact nickname. The present disclosure is not limited thereto.

On the basis of the foregoing embodiment, the adding, by the UE, the contact information to an address book of the UE may be specifically: determining, by the UE, whether the current address book includes the contact communication information; if not, adding the contact information to the address book of the UE; or if yes, ending the procedure, without needing to add the contact information.

Figure 8:
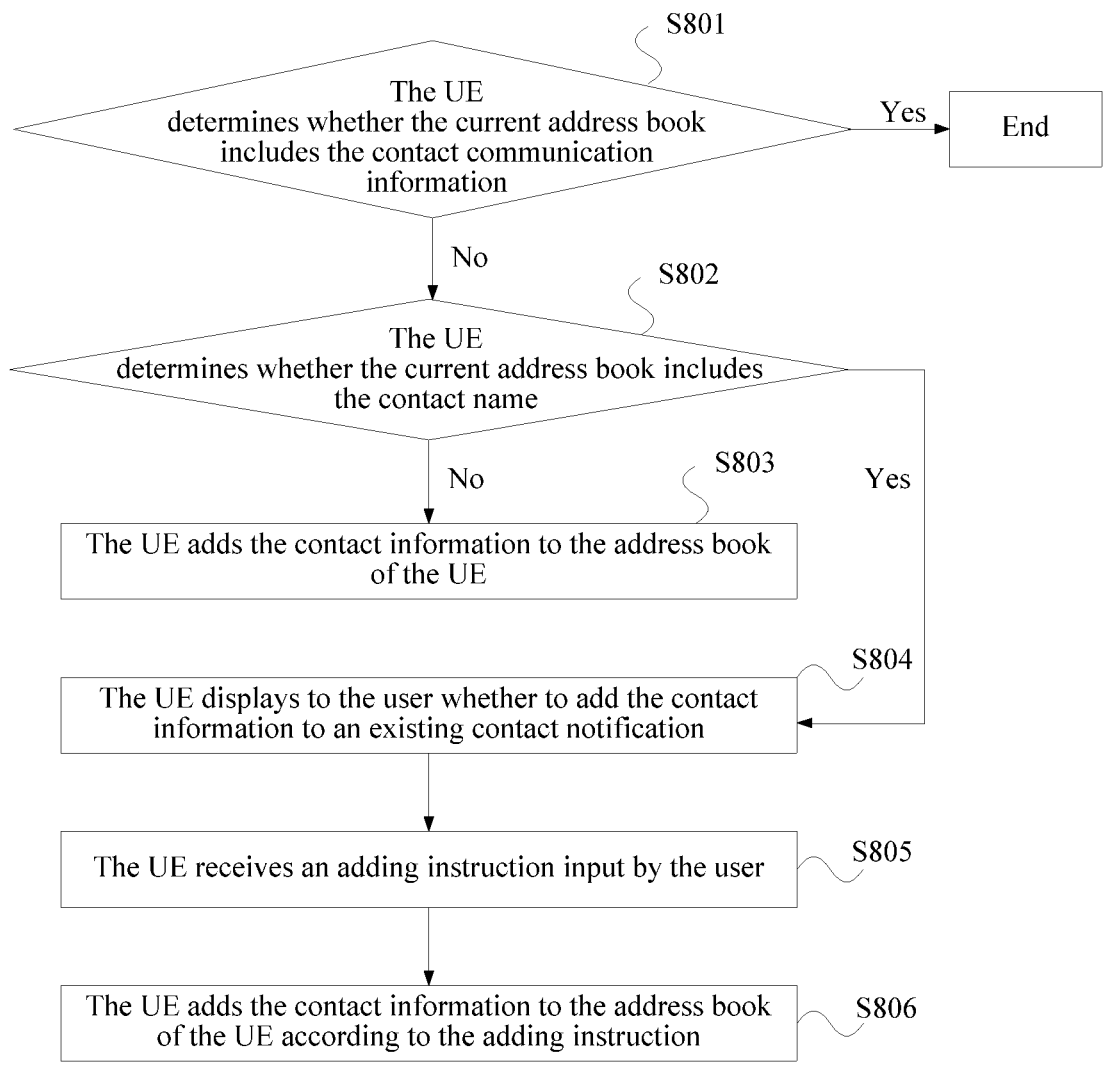
FIG. 8 is a schematic flowchart of Embodiment 8 of a method for adding contact information according to the present disclosure.

FIG. 8 is a schematic flowchart of Embodiment 8 of a method for adding contact information according to the present disclosure. The adding, by the UE, the contact information to an address book of the UE may be specifically as follows.

S801: The UE determines whether the current address book includes the contact communication information; if not, perform S802, or if yes, end the procedure.

S802: The UE determines whether the current address book includes the contact name; if not, perform S803, or if yes, perform S804.

S803: The UE adds the contact information to the address book of the UE.

S804: The UE displays to the user whether to add the contact information to an existing contact notification. The notification may include multiple options, for example, "add to an existing contact", "create a new contact", "update a contact", "give up adding", for the user to select according to a need.

The "add to an existing contact" indicates adding other information in contact information except a contact name to an existing contact name in the current address book, where a name of the existing contact is the same as a contact name in the contact information. The "create a new contact" indicates creating contact information for a new contact. The "update a contact" refers to: when the contact information is overlapped with a part of information in the current address book of the UE, updating the other part of non-overlapped information to the address book, and deleting old information whose attribute is the same as that of the updated part in the current address book. For example, if an address book of Li Ming already includes a phone number "888888" of "Zhang Fang", and the phone number now needs to be updated to "123456", the UE adds "123456" to contact information of Zhang Fang and deletes the original "888888". The "give up adding" is skipping adding the contact information.

S805: The UE receives an adding instruction input by the user. That is, the user chooses according to "whether to add to an existing contact notification" displayed on a display screen, to form an adding instruction. The adding instruction may be selecting "add to an existing contact" or "create a new contact".

S806: The UE adds the contact information to the address book of the UE according to the adding instruction.

In another embodiment, if the current address book includes the contact name, and the user instructs to add the contact information as new contact information to the address book of the UE, the foregoing S806 may be specifically: adding, by the UE, the contact information as the new contact information to the address book of the UE, and adding a contact name distinguishing identifier. The name distinguishing identifier may be a preset specific symbol, a numeric sequence number, or the like, but is not limited thereto.

For example, if in a process in which Li Ming adds contact information of Zhang Fang, the UE finds that the current address book already includes the contact information of "Zhang Fang", the UE prompts Li Ming to select whether to add the contact information to the existing contact. If Li Ming selects "create a new contact", that is, adds the contact information of Zhang Fang as new contact information to the address book of the UE, the UE automatically adds a contact name distinguishing identifier, for example, during adding, identifies the currently newly added "Zhang Fang" as "Zhang Fang 1". The present disclosure is not limited thereto.

It should be noted that, if the gesture information mentioned in the foregoing embodiment initially extends along a horizontal direction and then includes a case of vertical sliding, a problem of up-down sliding of a communication interface may be caused. Therefore, when the UE recognizes that the gesture information includes a non-vertical and/or non-linear gesture, recognition of the communication interface for an up-down sliding gesture may be automatically blocked within a time period in which the gesture information is received, and is not recovered until the gesture information ends.

Figure 9:
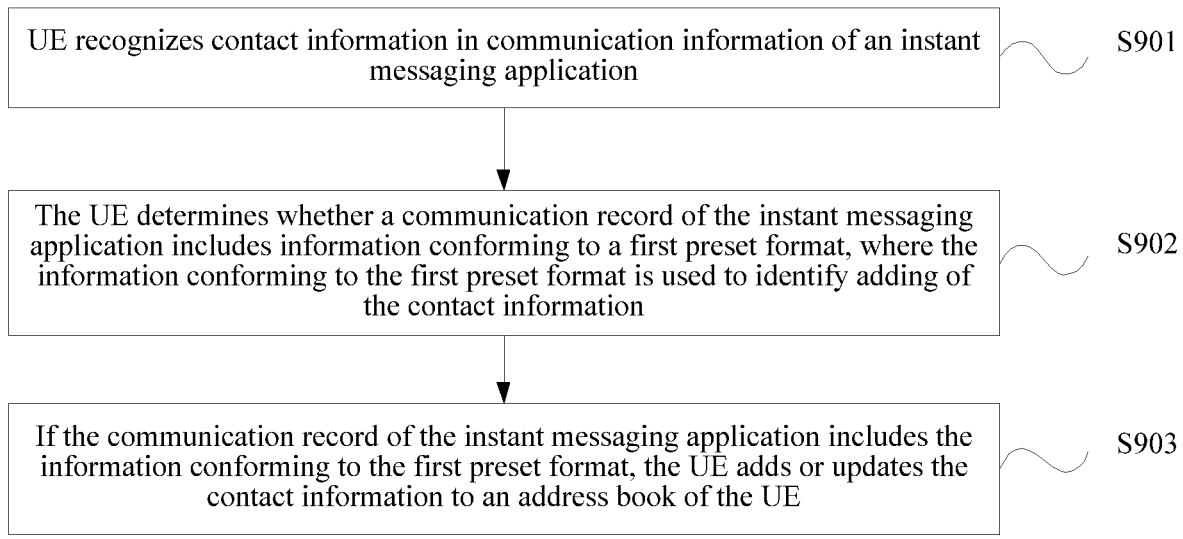
FIG. 9 is a schematic flowchart of Embodiment 9 of a method for adding contact information according to the present disclosure.

FIG. 9 is a schematic flowchart of Embodiment 9 of a method for adding contact information according to the present disclosure. As shown in FIG. 9, the method includes the following steps.

S901: UE recognizes contact information in communication information of an instant messaging application.

The instant messaging application may include: WeChat, QQ, AliWangWang, WhatsApp, KakaoTalk, Line, or the like.

The UE in this embodiment may be a terminal device such as a mobile phone, a tablet computer, or a wearable device that has a touchscreen function. These devices may automatically recognize the contact information in the instant messaging information.

In this embodiment, the contact information may include any information element or any combination of the following: a phone number, a QQ number, an email address, a WeChat number, a name, a nickname, or the like, but is not limited thereto.

S902: The UE determines whether a communication record of the instant messaging application includes information conforming to a first preset format, where the information conforming to the first preset format is used to identify adding of the contact information.

S903: If the communication record of the instant messaging application includes the information conforming to the first preset format, the UE adds or updates the contact information to an address book of the UE.

Specifically, the contact information is added to the address book of the UE, without deleting any information in the current address book. The updating the contact information to the address book of the UE refers to: when the contact information is overlapped with a part of information in the current address book of the UE, updating the other part of non-overlapped information to the address book, and deleting old information whose attribute is the same as that of the updated part in the current address book. For example, if an address book of Li Ming already includes a phone number "888888" of "Zhang Fang", and the phone number now needs to be updated to "123456", the UE adds "123456" to contact information of Zhang Fang and deletes the original "888888".

In this embodiment, UE automatically recognizes contact information in communication information of an instant messaging application, and determines whether a communication record of the instant messaging application includes information conforming to a first preset format; if the communication record of the instant messaging application includes the information conforming to the first preset format, the UE adds or updates the contact information to an address book of the UE, so that the UE can automatically recognize the contact information in the communication information of the instant messaging application and automatically complete adding or updating of the contact information according to the information conforming to the preset format, thereby improving efficiency of adding contact information, and also improving user experience.

On the basis of the foregoing embodiment, if the communication record of the instant messaging application does not include the information conforming to the first preset format, the UE determines whether the instant messaging application receives, within the preset time period, the information conforming to the first preset format. If the instant messaging application receives, within the preset time period, the information conforming to the first preset format, when receiving the information conforming to the first preset format, the UE adds or updates the contact information to the address book of the UE. If the instant messaging application still does not receive, within the preset time period, the information conforming to the first preset format, the UE prompts a user whether to add the contact information. That is, provided that the information conforming to the first preset format is received within the preset time period, the UE is triggered to add or update the contact information to the address book of the UE.

For example, the UE recognizes one piece of contact information in an instant messaging record, further determines that the current instant messaging record does not include the information conforming to the first preset format, and further continues to perform determining within the preset time period. If the information conforming to the first preset format is input by the user within this period, the UE is triggered to add or update the contact information to the address book. If after the preset time period is exceeded, the information conforming to the first preset format is still not included, whether to add or update the contact information is prompted to the user. Specifically, the prompt information may be displayed on the interface of the instant messaging application for the user to select.

The information conforming to the first preset format may be voice information or text information. A preset format of the voice information and the text information may refer to a specific word order. For the text information, the preset format may further refer to text information that includes a specific identifier. For example, if a particular conversation includes an identifier such as "@" or "#", the UE is triggered to add the contact information.

For example, the information conforming to the first preset format may be "add a phone number of xxx", or "update a phone number of xxx", where "xxx" represents a contact name, and this piece of information may be input by the user in a text or voice form. Using an interface shown in FIG. 3 as an example, for example, if Li Ming intends to add a phone number of Zhang Fang, Li Ming inputs "add the phone number of Zhang Fang" in a dialog box. If Li Ming inputs "add the phone number of Zhang Fang" by means of voice, the UE first converts the voice information to text information, and then determines whether the information conforming to the first preset format is included.

It should be noted that, the contact information includes at least a first information element and a second information element. That is, generally, one piece of contact information stored in an address book generally includes at least two information elements, such as a phone number, a contact name, and an email address, each of which may be used as one information element.

Further, in another embodiment, if the UE does not automatically recognize the contact information in the communication information, before the UE recognizes the contact information in the communication information of the instant messaging application, the UE may receive information that conforms to a second preset format and that is input by a user. The information conforming to the second preset format is used to identify recognition of the contact information, that is, the information conforming to the second preset format may trigger the UE to recognize the contact information in the communication record.

Similar to the information conforming to the first preset format, the information conforming to the second preset format may be voice information or text information. A preset format of the voice information and the text information may refer to a specific word order. For the text information, the preset format may further refer to text information that includes a specific identifier. The information conforming to the second preset format may be "search for the phone number of xxx", or "#xxx number#" that is input by using texts.

For example, if Li Ming has many conversations with Zhang Fang, when Li Ming intends to add a phone number of Zhang Fang, it is difficult to find, in a chat record, the phone number previously sent by Zhang Fang, and the UE does not automatically recognize the contact information or the UE previously recognizes the contact information but the user gives up adding the contact information. In this case, Li Ming may input texts or voice "search for the phone number of Zhang Fang" or "recognize the phone number of Zhang Fang", or input texts "#the phone number of Zhang Fang#", to trigger the UE to recognize, in the chat record, the number previously input by Zhang Fang.

After receiving the information that conforms to the second preset format and that is input by the user, the UE recognizes the contact information. The UE switches the current communication interface to a position of the contact information, and freezes the position within a preset time period, that is, blocks up-down sliding of the interface of the instant messaging application, to prevent the interface of the instant messaging application from being switched to another position and affecting the user in viewing the contact information. If the UE finds multiple numbers, a window pops up to prompt the user to perform a selection. If the user selects one of the numbers, the current interface of the instant messaging application is switched to a position of the number selected by the user.

In another embodiment, if the information conforming to the first preset format includes the second information element, the recognizing, by the UE, the contact information in the communication information of the instant messaging application is specifically: recognizing, by the UE, the first information element in the communication information of the instant messaging application. Accordingly, the adding, by the UE, the contact information to the address book of the UE is specifically: adding, by the UE, a combination of the first information element and the second information element as the contact information to the address book of the UE.

For example, Li Ming chats with Zhang Fang, Zhang Fang sends only her own phone number "123456", the UE recognizes the number "123456" and uses the number as the second information element, and Li Ming inputs the information "add the phone number of Zhang Fang" conforming to the first preset format in a dialog box. The information conforming to the first preset format includes the name "Zhang Fang". The UE directly uses "Zhang Fang" as the first information element, and the UE adds a combination of the first information element and the second information element as contact information to the address book of the UE.

In another embodiment, one communication record may include multiple information elements. For example, if two persons send multiple pieces of information including a string of digits or characters during a conversation, the UE may recognize all the information as a phone number. That is, the recognizing, by the UE, the first information element in the communication information of the instant messaging application is specifically: recognizing, by the UE, at least two first information elements in the communication information of the instant messaging application, displaying, by the UE, the at least two first information elements to the user, receiving, by the UE, one first information element selected from the at least two first information elements by the user, and using the first information element selected by the user as a to-be-added or to-be-updated first information element.

Certainly, sometimes, because there are many chat records, the user probably cannot determine which one of the at least two first information elements needs to be stored, and needs to confirm in a chatting scenario at that time. Therefore, in another embodiment, the using, by the UE, the first information element selected by the user as a to-be-added or to-be-updated first information element may be specifically: switching, by the UE, a current display interface of the instant messaging application to a position of the first information element selected by the user, so that the user determines, according to an information record of the position, whether the selected first information element is the to-be-added or to-be-updated first information element. Specifically, after being switched to the position of the first information element selected by the user, a touch control button may appear on the communication interface for the user to select. For example, there may be a "confirm" or "cancel" touch control button. If the user selects "confirm", it indicates that the selected first information element is the to-be-added or to-be-updated first information element. If the user selects denial information "cancel", it indicates that the selected first information element is not the to-be-added or to-be-updated first information element, and the user needs to return to perform a reselection.

Therefore, further, in a case in which the user selects the confirmation information, the UE receives the confirmation information input by the user, and uses the first information element selected by the user as the to-be-added or to-be-updated first information element.

Alternatively, in a case in which the user selects the denial information, the UE receives the denial information input by the user, and displays the at least two first information elements to the user again, and the user may perform a reselection.

Figure 10:
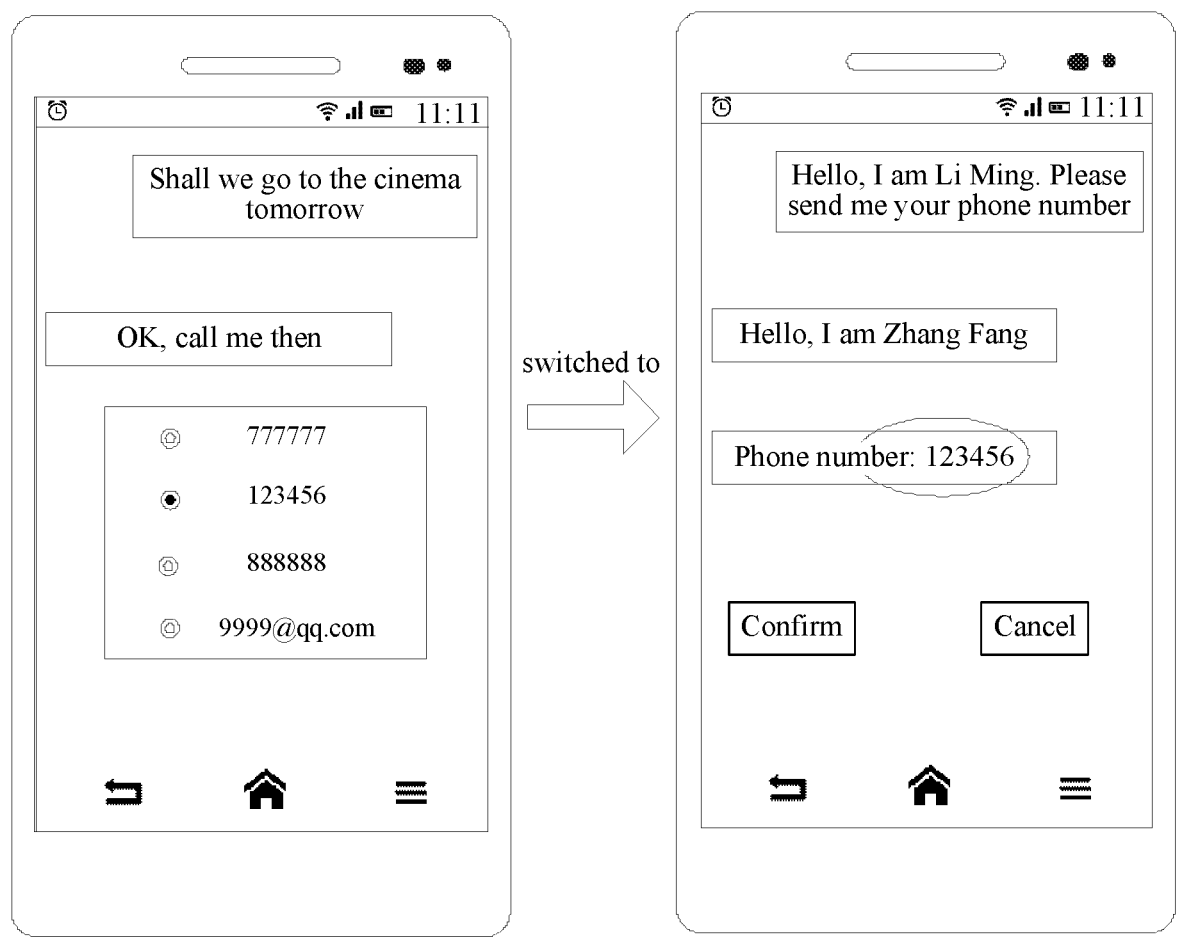
FIG. 10 is a schematic diagram of a user interface of Embodiment 10 of a method for adding contact information according to the present disclosure.

FIG. 10 is a schematic diagram of a user interface of Embodiment 10 of a method for adding contact information according to the present disclosure. As shown in FIG. 10, an interface on which two users communicate with each other in an instant messaging application is used as an example. The interface is a communication interface on UE of a first user Li Ming, and a second user is Zhang Fang. If the UE automatically recognizes contact information in communication information of the instant messaging application, or Li Ming intends to add a phone number of Zhang Fang, Li Ming actively inputs information "recognize the phone number of Zhang Fang" conforming to a second preset format. Because a conversation record of Li Ming and Zhang Fang includes four strings of digits, letters, symbols or a mixture of the three: "777777", "123456", "888888", and "9999@qq.com", after finding the information conforming to the second preset format, the UE displays all the four strings of characters to Li Ming, for Li Ming to select. If Li Ming selects "123456", the interface is switched to a position of "123456", and Li Ming determines, according to the context of the chat record, that "123456" is the to-be-added number. Li Ming may select a "confirm" button on the interface, so that "123456" is used as a to-be-added first information element. Further, after the first information element is matched with a second information element, the two elements are added to the address book together as contact information. If there is no second information element, the user is prompted to perform adding. If "123456" is not the number that Li Ming intends to add, Li Ming may select a "cancel" button on the interface, the interface is switched again to the interface that previously displays the four strings of characters, and Li Ming may perform a reselection.

As can be seen from the example shown in FIG. 10, the information element is not limited to only digits, but may be an email or WeChat number that includes letters, characters, and the like. When the UE automatically recognizes the contact information, all these mixed character strings are recognized and displayed to the user for the user to select. To improve user experience, recognition may also be performed according to the information that conforms to the second preset format and that is input by the user. For example, if the user inputs "recognize a phone number of xxx", the UE recognizes an all-digit string according to a quantity of digits of the phone number. If the user inputs "recognize an email of xxx", the UE recognizes a character string that includes "@". However, the present disclosure is not limited thereto. Recognition may be performed according to attributes of different information elements.

In another embodiment, the first information element is contact communication information, and the second information element is a contact name. The contact communication information includes: a contact instant messaging account, a contact phone number, a contact email, and the like, where the contact instant messaging account may refer to a QQ number, a WeChat number, or the like.

The adding or updating, by the UE, the contact information to an address book of the UE may be specifically: determining, by the UE, whether the current address book includes the contact communication information; if not, adding or updating the contact information to the address book of the UE; or if yes, ending the procedure, without needing to add the contact information.

In another embodiment, the adding or updating, by the UE, the contact information to an address book of the UE may be specifically: determining, by the UE, whether the current address book includes the contact communication information, and if the current address book does not include the contact communication information, determining whether the current address book includes the contact name; if not, adding the contact information to the address book of the user equipment, or if yes, displaying to the user whether to add or update the contact information to an existing contact notification, and adding or updating the contact information to the address book of the user equipment according to an instruction of the user.

If the current address book includes the contact name, and the user instructs to add the contact information as new contact information to the address book of the UE, the adding the contact information to the address book of the user equipment according to an instruction of the user is specifically: adding, by the UE, the contact information as the new contact information to the address book of the UE, and adding a contact name distinguishing identifier.

For example, if in a process in which Li Ming adds contact information of Zhang Fang, the UE finds that the current address book already includes the contact information of "Zhang Fang", the UE prompts Li Ming to select whether to add or update the contact information to the existing contact. If Li Ming selects "create a new contact", that is, adds the contact information of Zhang Fang as new contact information to the address book of the UE, the UE automatically adds a contact name distinguishing identifier, for example, during adding, identifies the currently newly added "Zhang Fang" as "Zhang Fang 1". The present disclosure is not limited thereto.

Specifically, for the method for adding contact information, refer to the embodiment shown in FIG. 9, and details are not described herein again.

Figure 11:
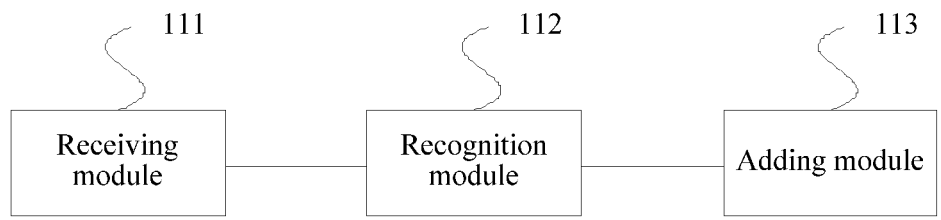
FIG. 11 is a schematic structural diagram of Embodiment 1 of user equipment according to the present disclosure.

FIG. 11 is a schematic structural diagram of Embodiment 1 of user equipment according to the present disclosure. As shown in FIG. 11, the user equipment includes a receiving module 111, a recognition module 112, and an adding module 113.

The receiving module 111 is configured to receive gesture information input by a user on a communication interface of an instant messaging application.

The recognition module 112 is configured to recognize, according to the gesture information, contact information in communication information corresponding to the communication interface.

The adding module 113 is configured to add the contact information to an address book of the user equipment.

In this embodiment, the UE receives gesture information input by a user on a communication interface of an instant messaging application, recognizes contact information in communication information according to the gesture information, and adds the contact information to an address book of the UE, so that contact information is automatically recognized according to the gesture information input by the user and is automatically added to the address book, thereby improving efficiency of adding the contact information in the communication information of the instant messaging application to the address book, improving man-machine interaction intelligence, and also improving user experience.

Figure 12:
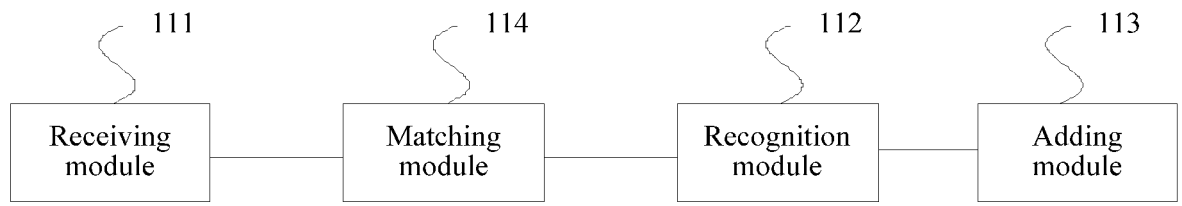
FIG. 12 is a schematic structural diagram of Embodiment 2 of user equipment according to the present disclosure.

FIG. 12 is a schematic structural diagram of Embodiment 2 of user equipment according to the present disclosure. As shown in FIG. 12, on the basis of FIG. 11, the user equipment further includes a matching module 114, configured to: match the gesture information with preset gesture recognition information; and determine that the gesture information is the same as the preset gesture recognition information.

Further, the contact information includes at least a first information element and a second information element.

In another embodiment, if the communication information corresponding to the communication interface includes voice information, the recognition module 112 is further configured to convert the voice information to text information before recognizing, according to the gesture information, the contact information in the communication information corresponding to the communication interface.

In another embodiment, the recognition module 112 is specifically configured to: recognize the first information element in a range circled by or information tapped by the gesture information on the communication interface of the instant messaging application; recognize the second information element according to directions of a start position and a stop position of the gesture information on the communication interface of the instant messaging application relative to a position of the first information element; and use a combination of the first information element and the second information element as the contact information.

In another embodiment, the receiving module 111 is specifically configured to receive first gesture information and second gesture information that are consecutively input by the user on the communication interface of the instant messaging application, where the first gesture information and the second gesture information are at an interval of a first preset time period. Accordingly, The recognition module 112 is specifically configured to: recognize the first information element in a range circled by or information tapped by the first gesture information; recognize the second information element in a range circled by or information tapped by the second gesture information; and use a combination of the first information element and the second information element as the contact information.

In another embodiment, the recognition module 112 is specifically configured to: recognize the first information element in a range circled by or information tapped by the first gesture information; recognize the second information element in a stop position of the second gesture information, where the second gesture information is to drag the first information element to a position of the second information element; and use a combination of the first information element and the second information element as the contact information.

Further, in another embodiment, the receiving module 111 is specifically configured to receive first gesture information, second gesture information, and third gesture information that are consecutively input by the user on the communication interface of the instant messaging application, where the second gesture information is used to associate the first gesture information and the third gesture information. Accordingly, The recognition module 112 is specifically configured to: recognize the first information element in a range circled by or information tapped by the first gesture information; recognize the second information element in a range circled by or information tapped by the third gesture information; and combine the first information element and the second information element as the contact information according to the second gesture information.

On the basis of the foregoing embodiment, the receiving module 111 is further configured to receive information about a tap by the user on the communication interface on any information element in the contact information within a second preset time period, where the information about the tap is used to trigger the adding module 113 to add the contact information to the address book of the user equipment.

Further, for example, the first information element is contact communication information, and the second information element is a contact name.

The contact communication information includes at least one of the following: a contact instant messaging account, a contact phone number, or a contact email.

The adding module 113 is specifically configured to: determine whether the current address book includes the contact communication information, and if not, add the contact information to the address book of the user equipment.

In another embodiment, the adding module 113 is specifically configured to: determine whether the current address book includes the contact communication information; if the current address book does not include the contact communication information, determine whether the current address book includes the contact name; and if not, add the contact information to the address book of the user equipment, or if yes, display to the user whether to add the contact information to an existing contact notification, and add the contact information to the address book of the user equipment according to an instruction of the user.

On the basis of the foregoing embodiment, if the current address book includes the contact name, and the user instructs to add the contact information as new contact information to the address book of the user equipment, the adding module 113 is specifically configured to add the contact information as the new contact information to the address book of the user equipment, and add a contact name distinguishing identifier.

Figure 13:
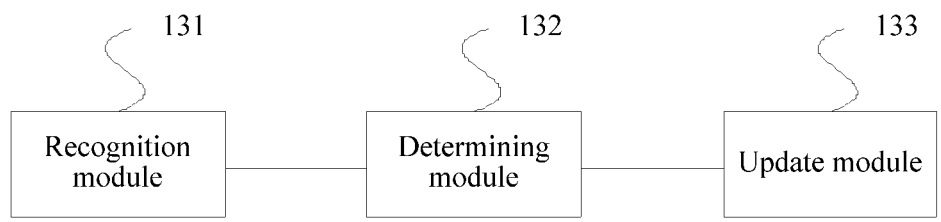
FIG. 13 is a schematic structural diagram of Embodiment 3 of user equipment according to the present disclosure.

FIG. 13 is a schematic structural diagram of Embodiment 3 of user equipment according to the present disclosure. As shown in FIG. 13, the user equipment includes a recognition module 131, a determining module 132, and an update module 133.

The recognition module 131 is configured to recognize contact information in communication information of an instant messaging application.

The determining module 132 is configured to determine whether a communication record of the instant messaging application includes information conforming to a first preset format, where the information conforming to the first preset format is used to identify adding of the contact information.

The update module 133 is configured to: if the determining module determines that the communication record of the instant messaging application includes the information conforming to the first preset format, add or update the contact information to an address book of the user equipment.

In this embodiment, the UE automatically recognizes contact information in communication information of an instant messaging application, and determines whether a communication record of the instant messaging application includes information conforming to a first preset format; if the communication record of the instant messaging application includes the information conforming to the first preset format, the UE adds or updates the contact information to an address book of the UE, so that the UE can automatically recognize the contact information in the communication information of the instant messaging application and automatically complete adding or updating of the contact information according to the information conforming to the preset format, thereby improving efficiency of adding contact information, and also improving user experience.

Further, if the communication record of the instant messaging application does not include the information conforming to the first preset format, the determining module 132 is further configured to determine whether the instant messaging application receives, within a preset time period, the information conforming to the first preset format. Accordingly, If the determining module 132 determines that the instant messaging application receives, within the preset time period, the information conforming to the first preset format, the update module 133 adds or updates the contact information to the address book of the user equipment when the instant messaging application receives the information conforming to the first preset format. If the determining module 132 determines that the instant messaging application does not receive, within the preset time period, the information conforming to the first preset format, the update module 133 prompts a user whether to add the contact information.

It should be noted that, the contact information includes at least a first information element and a second information element.

Figure 14:
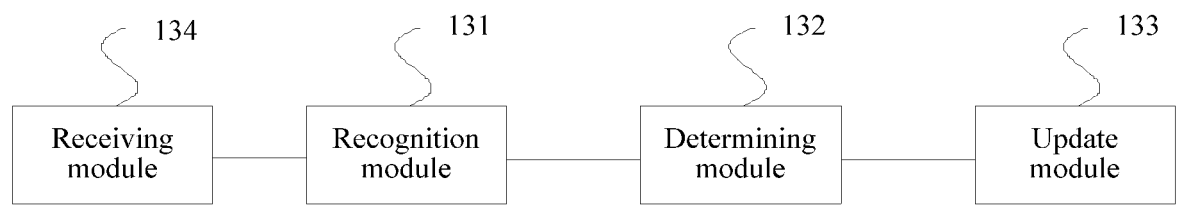
FIG. 14 is a schematic structural diagram of Embodiment 4 of user equipment according to the present disclosure.

FIG. 14 is a schematic structural diagram of Embodiment 4 of user equipment according to the present disclosure. As shown in FIG. 14, on the basis of FIG. 13, the user equipment may further include: a receiving module 134, configured to receive information that conforms to a second preset format and that is input by the user, where the information conforming to the second preset format is used to identify recognition of the contact information.

In another embodiment, if the information conforming to the first preset format includes the second information element, the recognition module 131 is specifically configured to recognize the first information element in the communication information of the instant messaging application. The update module 133 is specifically configured to add or update a combination of the first information element and the second information element as the contact information to the address book of the user equipment.

In another embodiment, the recognition module 131 is specifically configured to: recognize at least two first information elements in the communication information of the instant messaging application; display the at least two first information elements to the user; and receive one first information element selected from the at least two first information elements by the user, and use the first information element selected by the user as a to-be-added or to-be-updated first information element.

The recognition module 131 is specifically configured to switch a current display interface of the instant messaging application to a position of the first information element selected by the user, so that the user determines, according to an information record of the position, whether the selected first information element is the to-be-added or to-be-updated first information element; and receive confirmation information input by the user, and use the first information element selected by the user as the to-be-added or to-be-updated first information element; or receive denial information input by the user, and display the at least two first information elements to the user again.

Further, for example, the first information element is contact communication information, and the second information element is a contact name.

The contact communication information includes at least one of the following: a contact instant messaging account, a contact phone number, or a contact email.

The update module 133 is specifically configured to: determine whether the current address book includes the contact communication information, and if not, add or update the contact information to the address book of the user equipment.

In another embodiment, the update module 133 is specifically configured to: determine whether the current address book includes the contact communication information; if the current address book does not include the contact communication information, determine whether the current address book includes the contact name; and if not, add the contact information to the address book of the user equipment, or if yes, display to the user whether to add or update the contact information to an existing contact notification, and add or update the contact information to the address book of the user equipment according to an instruction of the user.

Further, if the current address book includes the contact name, and the user instructs to add the contact information as new contact information to the address book of the user equipment, the update module 133 is specifically configured to add the contact information as the new contact information to the address book of the user equipment, and add a contact name distinguishing identifier.

Figure 15:
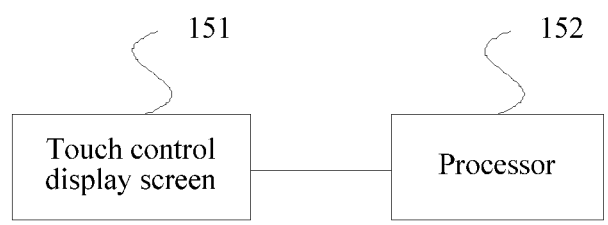
FIG. 15 is a schematic structural diagram of Embodiment 5 of user equipment according to the present disclosure.

FIG. 15 is a schematic structural diagram of Embodiment 5 of user equipment according to the present disclosure. As shown in FIG. 15, the user equipment includes: a touch control display screen 151 and a processor 152, where a communication interface of an instant messaging application is displayed on the touch control display screen 151. Specifically, The processor 152 is configured to receive gesture information input by a user on the communication interface of the instant messaging application; recognize, according to the gesture information, contact information in communication information corresponding to the communication interface; and add the contact information to an address book of the user equipment.

The user equipment is configured to execute the foregoing method embodiments, and technical effects and implementation principles thereof are similar, which are not described herein again.

Further, the processor 152 is further configured to: before recognizing, according to the gesture information, the contact information in the communication information corresponding to the communication interface, match the gesture information with preset gesture recognition information; and determine that the gesture information is the same as the preset gesture recognition information.

It should be noted that, the contact information includes at least a first information element and a second information element.

If the communication information corresponding to the communication interface includes voice information, the processor 152 is further configured to convert the voice information to text information before recognizing, according to the gesture information, the contact information in the communication information corresponding to the communication interface.

In another embodiment, the processor 152 is specifically configured to: recognize the first information element in a range circled by or information tapped by the gesture information on the communication interface of the instant messaging application; recognize the second information element according to directions of a start position and a stop position of the gesture information on the communication interface of the instant messaging application relative to a position of the first information element; and use a combination of the first information element and the second information element as the contact information.

In another embodiment, the processor 152 is specifically configured to receive first gesture information and second gesture information that are consecutively input by the user on the communication interface of the instant messaging application, where the first gesture information and the second gesture information are at an interval of a first preset time period. Accordingly, The processor 152 is specifically configured to: recognize the first information element in a range circled by or information tapped by the first gesture information; recognize the second information element in a range circled by or information tapped by the second gesture information; and use a combination of the first information element and the second information element as the contact information.

In another embodiment, the processor 152 is specifically configured to: recognize the first information element in a range circled by or information tapped by the first gesture information; recognize the second information element in a stop position of the second gesture information, where the second gesture information is to drag the first information element to a position of the second information element; and use a combination of the first information element and the second information element as the contact information.

In another embodiment, the processor 152 is specifically configured to receive first gesture information, second gesture information, and third gesture information that are consecutively input by the user on the communication interface of the instant messaging application, where the second gesture information is used to associate the first gesture information and the third gesture information. Accordingly, The processor 152 is specifically configured to: recognize the first information element in a range circled by or information tapped by the first gesture information; recognize the second information element in a range circled by or information tapped by the third gesture information; and combine the first information element and the second information element as the contact information according to the second gesture information.

The processor 152 is configured to: after recognizing, according to the gesture information, the contact information in the communication information corresponding to the communication interface, receive information about a tap by the user on the communication interface on any information element in the contact information within a second preset time period, where the information about the tap is used to trigger the processor to add the contact information to the address book of the user equipment.

For example, the first information element is contact communication information, and the second information element is a contact name, where the contact communication information includes at least one of the following: a contact instant messaging account, a contact phone number, or a contact email.

Further, the processor 152 is configured to: determine whether the current address book includes the contact communication information, and if not, add the contact information to the address book of the user equipment.

In another embodiment, the processor 152 is configured to: determine whether the current address book includes the contact communication information; if the current address book does not include the contact communication information, determine whether the current address book includes the contact name; and if not, add the contact information to the address book of the user equipment, or if yes, display to the user whether to add the contact information to an existing contact notification, and add the contact information to the address book of the user equipment according to an instruction of the user.

Further, if the current address book includes the contact name, and the user instructs to add the contact information as new contact information to the address book of the user equipment, the processor 152 adds the contact information as the new contact information to the address book of the user equipment, and adds a contact name distinguishing identifier.

Figure 16:
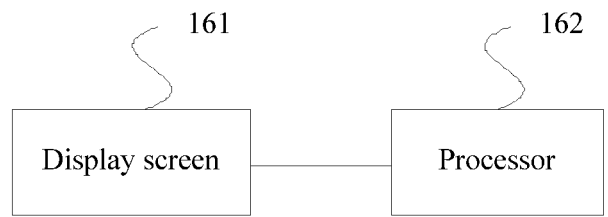
FIG. 16 is a schematic structural diagram of Embodiment 6 of user equipment according to the present disclosure.

FIG. 16 is a schematic structural diagram of Embodiment 6 of user equipment according to the present disclosure. As shown in FIG. 16, the user equipment includes: a display screen 161 and a processor 162, where a communication interface of an instant messaging application is displayed on the display screen 161. The display screen 161 may be a touch control screen, or may not be a touch control screen.

The processor 162 is configured to: recognize contact information in communication information of the instant messaging application; determine whether a communication record of the instant messaging application includes information conforming to a first preset format, where the information conforming to the first preset format is used to identify adding of the contact information; and if the communication record of the instant messaging application includes the information conforming to the first preset format, add or update the contact information to an address book of the user equipment.

If the communication record of the instant messaging application does not include the information conforming to the first preset format, the processor 162 is further configured to determine whether the instant messaging application receives, within a preset time period, the information conforming to the first preset format.

Further, if the instant messaging application receives, within the preset time period, the information conforming to the first preset format, the processor 162 adds or updates the contact information to the address book of the user equipment when the instant messaging application receives the information conforming to the first preset format; and if the instant messaging application does not receive, within the preset time period, the information conforming to the first preset format, the processor 162 prompts a user whether to add the contact information.

It should be noted that, the contact information includes at least a first information element and a second information element.

The processor 162 is further configured to: before recognizing the contact information in the communication information of the instant messaging application, receive information that conforms to a second preset format and that is input by the user, where the information conforming to the second preset format is used to identify recognition of the contact information.

In another embodiment, if the information conforming to the first preset format includes the second information element, the processor 162 is specifically configured to recognize the first information element in the communication information of the instant messaging application; and accordingly, the processor 162 adds or updates the contact information to the address book of the user equipment, and specifically: adds or updates a combination of the first information element and the second information element as the contact information to the address book of the user equipment.

Further, the processor 162 is configured to: recognize at least two first information elements in the communication information of the instant messaging application; display the at least two first information elements to the user; and receive one first information element selected from the at least two first information elements by the user, and use the first information element selected by the user as a to-be-added or to-be-updated first information element.

The processor 162 is specifically configured to switch a current display interface of the instant messaging application to a position of the first information element selected by the user, so that the user determines, according to an information record of the position, whether the selected first information element is the to-be-added or to-be-updated first information element; and receive confirmation information input by the user, and use the first information element selected by the user as the to-be-added or to-be-updated first information element; or receive denial information input by the user, and display the at least two first information elements to the user again.

The first information element is contact communication information, and the second information element is a contact name.

The contact communication information includes at least one of the following: a contact instant messaging account, a contact phone number, or a contact email.

The processor 162 is specifically configured to: determine whether the current address book includes the contact communication information, and if not, add or update the contact information to the address book of the user equipment.

The processor 162 is specifically configured to: determine whether the current address book includes the contact communication information; if the current address book does not include the contact communication information, determine whether the current address book includes the contact name; and if not, add the contact information to the address book of the user equipment, or if yes, display to the user whether to add or update the contact information to an existing contact notification, and add or update the contact information to the address book of the user equipment according to an instruction of the user.

Further, if the current address book includes the contact name, and the user instructs to add the contact information as new contact information to the address book of the user equipment, the processor 162 is specifically configured to add the contact information as the new contact information to the address book of the user equipment, and add a contact name distinguishing identifier.

In the several embodiments provided in the present disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method, comprising:
   receiving, by user equipment, gesture information input by a user on a communication interface of an instant messaging application, wherein the gesture information is input using a touchscreen comprised in the user equipment;
   in response to receiving the gesture information, recognizing, by the user equipment, according to the gesture information, contact information in communication information corresponding to the communication interface; wherein a same portion of the gesture information both triggers the recognition by the user equipment of the contact information and indicates a location on the communication interface of at least a portion of the contact information, and wherein recognizing the contact information in the communication information corresponding to the communication interface comprises:
   recognizing, by the user equipment, a first information element in a range circled by the gesture information on the communication interface of the instant messaging application;
   in response to recognizing the first information element in the range circled by the gesture information, automatically determining, by the user equipment, a start position and a stop position of the gesture information on the communication interface of the instant messaging application relative to a position of the first information element, and automatically recognizing, by the user equipment, a second information element according to directions of the start position and the stop position of the gesture information on the communication interface of the instant messaging application relative to the position of the first information element; and
   determining, by the user equipment, a combination of the first information element that has been recognized and the second information element that has been recognized to be the contact information; and
   adding, by the user equipment, the contact information to an address book of the user equipment.

2. The method according to claim 1, wherein before recognizing, by the user equipment, according to the gesture information, the contact information in the communication information corresponding to the communication interface, the method comprises:
   matching, by the user equipment, the gesture information with preset gesture recognition information; and
   determining, by the user equipment, that the gesture information is the same as the preset gesture recognition information.

3. The method according to claim 1, wherein the first information element is contact communication information, and the second information element is a contact name, wherein the contact communication information comprises: a contact instant messaging account, a contact phone number, or a contact email.

4. The method according to claim 3, wherein receiving the gesture information input by a user on the communication interface of an instant messaging application comprises:
receiving, by the user equipment, first gesture information and second gesture information that are consecutively input by the user on the communication interface of the instant messaging application, wherein the first gesture information and the second gesture information are at an interval of a first preset time period.

5. The method according to claim 3, wherein after recognizing the contact information in the communication information corresponding to the communication interface, the method further comprises:
receiving, by the user equipment, information about a tap by the user on the communication interface on any information element in the contact information within a second preset time period, wherein the information about the tap triggers the user equipment to add the contact information to the address book of the user equipment.

6. The method according to claim 1, wherein the communication information corresponding to the communication interface comprises voice information, and before recognizing the contact information in the communication information corresponding to the communication interface, the method comprises:
converting, by the user equipment, the voice information to text information.

7. The method according to claim 1, wherein automatically recognizing, by the user equipment, the second information element according to the directions of the start position and the stop position of the gesture information on the communication interface of the instant messaging application relative to the position of the first information element comprises:
in response to the start position and the stop position of the gesture information on the communication interface of the instant messaging application relative to the position of the first information element being both above the first information element, automatically searching for and recognizing the second information element in information above the first information element.

8. The method according to claim 1, wherein automatically recognizing, by the user equipment, the second information element according to the directions of the start position and the stop position of the gesture information on the communication interface of the instant messaging application relative to the position of the first information element comprises:
in response to the start position and the stop position of the gesture information on the communication interface of the instant messaging application relative to the position of the first information element being both below the first information element, automatically searching for and recognizing the second information element in information below the first information element.

9. The method according to claim 1, wherein automatically recognizing, by the user equipment, the second information element according to the directions of the start position and the stop position of the gesture information on the communication interface of the instant messaging application relative to the position of the first information element comprises:
in response to the start position and the stop position of the gesture information on the communication interface of the instant messaging application relative to the position of the first information element being both on a right side the first information element, automatically searching for and recognizing the second information element in information on the right side of the first information element.

10. The method according to claim 1, wherein automatically recognizing, by the user equipment, the second information element according to the directions of the start position and the stop position of the gesture information on the communication interface of the instant messaging application relative to the position of the first information element comprises:
in response to the start position and the stop position of the gesture information on the communication interface of the instant messaging application relative to the position of the first information element being both on a left side the first information element, automatically searching for and recognizing the second information element in information on the left side of the first information element.

11. User equipment, comprising:
a touchscreen;
a non-transitory memory storage comprising instructions; and
one or more processors in communication with the memory, wherein the one or more processors execute the instructions to:
receive, using the touchscreen, gesture information input by a user on a communication interface of an instant messaging application;
in response to receiving the gesture information, recognize, according to the gesture information, contact information in communication information corresponding to the communication interface, wherein a same portion of the gesture information both triggers the recognition by the user equipment of the contact information and indicates a location on the communication interface of at least a portion of the contact information, and wherein recognizing the contact information in the communication information corresponding to the communication interface comprises;
recognizing a first information element in a range circled by the gesture information on the communication interface of the instant messaging application;
in response to recognizing the first information element in the range circled by the gesture information, automatically determining a start position and a stop position of the gesture information on the communication interface of the instant messaging application relative to a position of the first information element, and automatically recognizing a second information element according to directions of the start position and the stop position of the gesture information on the communication interface of the instant messaging application relative to the position of the first information element; and
determining a combination of the first information element that has been recognized and the second information element that has been recognized to be the contact information; and add the contact information to an address book of the user equipment.

12. The user equipment according to claim 11, wherein the one or more processors further execute the instructions to:

match the gesture information with preset gesture recognition information; and determine that the gesture information is the same as the preset gesture recognition information.

13. The user equipment according to claim 11, wherein the first information element is contact communication information, and the second information element is a contact name, wherein the contact communication information comprises: a contact instant messaging account, a contact phone number, or a contact email.

14. The user equipment according to claim 13, wherein the one or more processors further execute the instructions to:

receive information about a tap by the user on the communication interface on any information element in the contact information within a second preset time period, wherein the information about the tap triggers the user equipment to add the contact information to the address book of the user equipment.

15. The user equipment according to claim 11, wherein the one or more processors further execute the instructions to:

convert voice information comprised in the communication information corresponding to the communication interface to text information.

16. The user equipment according to claim 11, wherein automatically recognizing the second information element according to the directions of the start position and the stop position of the gesture information on the communication interface of the instant messaging application relative to the position of the first information element comprises:

in response to the start position and the stop position of the gesture information on the communication interface of the instant messaging application relative to the position of the first information element being both above the first information element, automatically searching for and recognizing the second information element in information above the first information element.

17. The user equipment according to claim 11, wherein automatically recognizing the second information element according to the directions of the start position and the stop position of the gesture information on the communication interface of the instant messaging application relative to the position of the first information element comprises:

in response to the start position and the stop position of the gesture information on the communication interface of the instant messaging application relative to the position of the first information element being both below the first information element, automatically searching for and recognizing the second information element in information below the first information element.

18. The user equipment according to claim 11, wherein automatically recognizing the second information element according to the directions of the start position and the stop position of the gesture information on the communication interface of the instant messaging application relative to the position of the first information element comprises:

in response to the start position and the stop position of the gesture information on the communication interface of the instant messaging application relative to the position of the first information element being both on a right side the first information element, automatically searching for and recognizing the second information element in information on the right side of the first information element.

19. The user equipment according to claim 11, wherein automatically recognizing the second information element according to the directions of the start position and the stop position of the gesture information on the communication interface of the instant messaging application relative to the position of the first information element comprises:

in response to the start position and the stop position of the gesture information on the communication interface of the instant messaging application relative to the position of the first information element being both on a left side the first information element, automatically searching for and recognizing the second information element in information on the left side of the first information element.

* * * * *